United States Patent
Allington et al.

(10) Patent No.: US 9,016,435 B2
(45) Date of Patent: Apr. 28, 2015

(54) LINE DISPENSING DEVICE WITH EDDY CURRENT BRAKING FOR USE WITH CLIMBING AND EVACUATION

(71) Applicant: Holmes Solutions Limited, Christchurch (NZ)

(72) Inventors: Christopher James Allington, Christchurch R D (NZ); Andrew Karl Diehl, Christchurch (NZ); Bruce John Robertson, Christchurch (NZ)

(73) Assignee: Eddy Current Limited Partnership (NZ)

( * ) Notice: Subject to any disclaimer, the term of this patent is extended or adjusted under 35 U.S.C. 154(b) by 0 days.

(21) Appl. No.: 13/924,004

(22) Filed: Jun. 21, 2013

(65) Prior Publication Data

US 2014/0048639 A1 Feb. 20, 2014

Related U.S. Application Data

(63) Continuation of application No. 12/858,839, filed on Aug. 18, 2010, now Pat. No. 8,490,751, which is a continuation-in-part of application No. PCT/NZ2010/000011, filed on Jan. 29, 2010.

(30) Foreign Application Priority Data

Mar. 12, 2009 (NZ) ........................ 575464

(51) Int. Cl.
*A62B 1/08* (2006.01)
*H02K 49/04* (2006.01)
*H02K 16/00* (2006.01)

(52) U.S. Cl.
CPC ............. *A62B 1/08* (2013.01); *H02K 49/046* (2013.01); *H02K 16/005* (2013.01)

(58) Field of Classification Search
USPC ............... 188/164, 156, 161, 184, 185, 267; 182/231–240, 230; 242/412.1, 412.2, 242/412.3, 396, 396.1
See application file for complete search history.

(56) References Cited

U.S. PATENT DOCUMENTS

| | | | | |
|---|---|---|---|---|
| 2,122,315 | A * | 6/1938 | Fosty et al. | 182/237 |
| 3,447,006 | A * | 5/1969 | Bair | 310/93 |
| 4,416,430 | A * | 11/1983 | Totten | 242/377 |
| 4,434,971 | A * | 3/1984 | Cordrey | 254/273 |
| 4,567,963 | A * | 2/1986 | Sugimoto | 182/236 |
| 4,938,435 | A | 7/1990 | Varner et al. | |
| 5,692,693 | A | 12/1997 | Yamaguchi | |
| 5,711,404 | A * | 1/1998 | Lee | 188/164 |
| 5,722,612 | A | 3/1998 | Feathers | |

(Continued)

FOREIGN PATENT DOCUMENTS

DE 9300966 U1 3/1993
DE 102005032694 1/2007

(Continued)

OTHER PUBLICATIONS

Climbing Wall Descent Controllers—Instruction Manual v3. Aug. 18, 2008, pp. 1-20.

(Continued)

*Primary Examiner* — Daniel Cahn

(57) ABSTRACT

This disclosure describes embodiments of novel line dispensing devices and methods for dispensing and retracting a line of a line dispensing device.

8 Claims, 16 Drawing Sheets

(56) References Cited

U.S. PATENT DOCUMENTS

| | | | |
|---|---|---|---|
| 6,086,005 A * | 7/2000 | Kobayashi et al. | 242/288 |
| 6,561,451 B1 * | 5/2003 | Steinich | 242/563.2 |
| 6,793,203 B2 * | 9/2004 | Heinrichs et al. | 254/342 |
| 6,962,235 B2 * | 11/2005 | Leon | 182/73 |
| 7,011,607 B2 * | 3/2006 | Kolda et al. | 482/57 |
| 7,513,334 B2 | 4/2009 | Calver | |
| 7,528,514 B2 * | 5/2009 | Cruz et al. | 310/103 |
| 8,490,751 B2 | 7/2013 | Allington et al. | |
| 8,567,561 B2 * | 10/2013 | Strasser et al. | 182/234 |
| 2002/0179372 A1 * | 12/2002 | Schreiber et al. | 182/238 |
| 2004/0168855 A1 * | 9/2004 | Leon | 182/236 |
| 2007/0228202 A1 * | 10/2007 | Scharf et al. | 242/366 |
| 2008/0105503 A1 * | 5/2008 | Pribonic | 188/267 |
| 2009/0026303 A1 * | 1/2009 | Schmitz et al. | 242/419.3 |
| 2009/0166459 A1 | 7/2009 | Niitsuma et al. | |
| 2009/0178887 A1 * | 7/2009 | Reeves et al. | 182/239 |
| 2009/0211846 A1 * | 8/2009 | Taylor | 182/231 |
| 2010/0065373 A1 * | 3/2010 | Stone et al. | 182/233 |
| 2010/0211239 A1 * | 8/2010 | Christensen et al. | 701/21 |
| 2011/0147125 A1 * | 6/2011 | Blomberg | 182/232 |
| 2012/0055740 A1 | 3/2012 | Allington et al. | |
| 2013/0186721 A1 * | 7/2013 | Bogdanowicz et al. | 188/267 |

FOREIGN PATENT DOCUMENTS

| | | |
|---|---|---|
| GB | 2352644 A | 2/2001 |
| GB | 2352645 A | 2/2001 |
| JP | 10098868 A | 4/1998 |
| JP | 11315662 A | 11/1999 |
| JP | 2000-316272 | 11/2000 |
| JP | 2001-17041 | 1/2001 |
| WO | WO 95/16496 A1 | 6/1995 |

OTHER PUBLICATIONS

TruBlue Auto Belay User Manual, Model TB150-12C, pp. 1-25.

PCT International Search Report and Written Opinion mailed Feb. 23, 2011, International Application No. PCT/NZ2010/00011, 11 pages.

MSA, The Safety Company, Stop Use Notice for Redpoint and Auto-Belay Descenders, dated Oct. 14, 2009, 1 page.

* cited by examiner

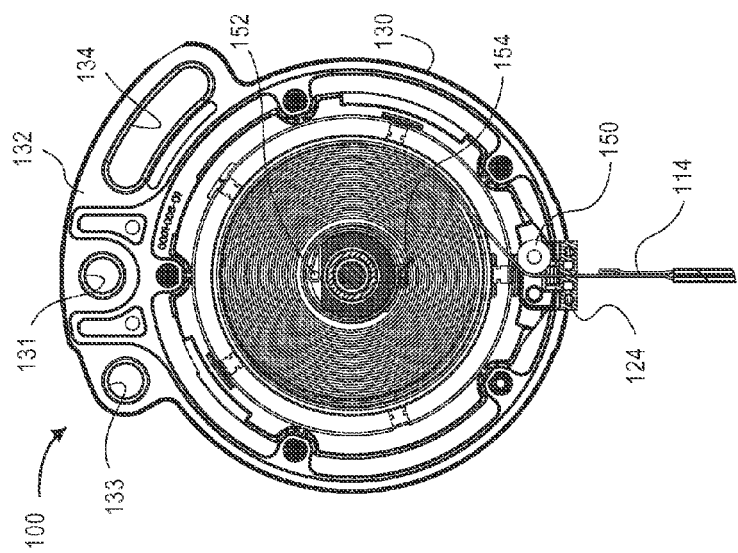
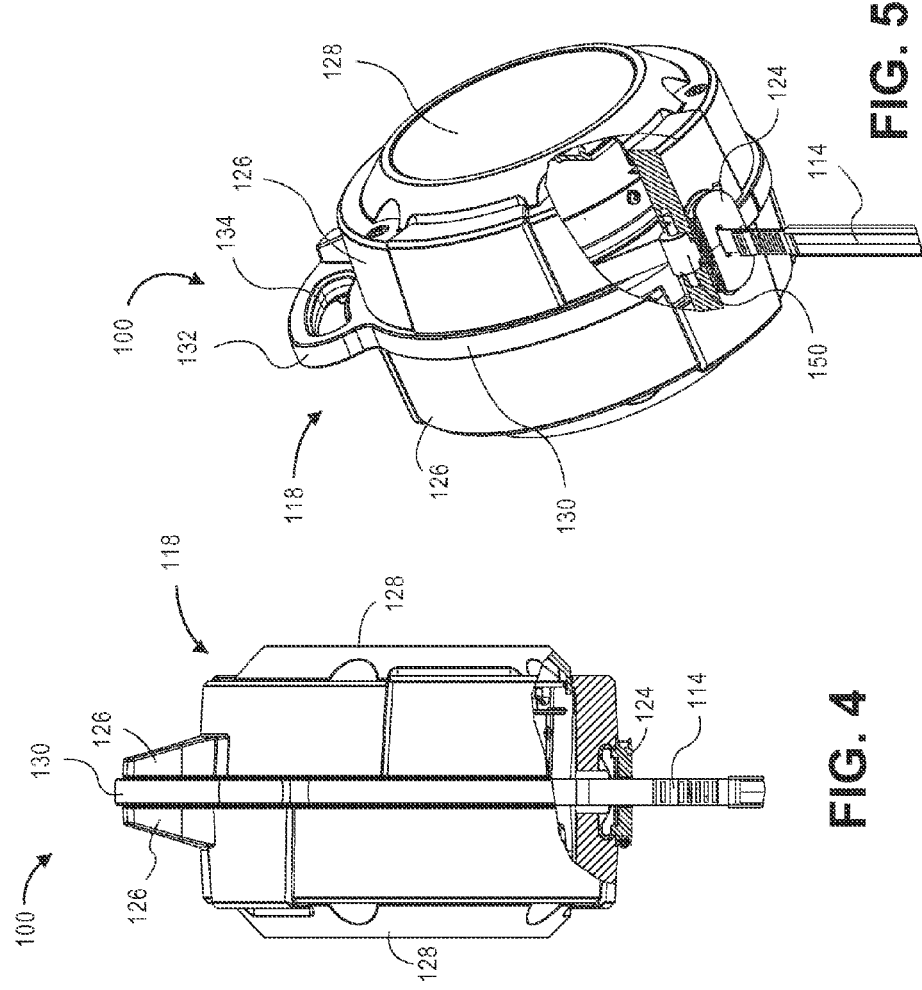
FIG. 6
FIG. 5
FIG. 4

LINE DISPENSING DEVICE WITH EDDY CURRENT BRAKING FOR USE WITH CLIMBING AND EVACUATION

RELATED APPLICATIONS

This application is a continuation application of and claims the benefit of priority from U.S. patent application Ser. No. 12/858,839, filed on Aug. 18, 2010, now U.S. Pat. No. 8,490,751; which is a continuation-in-part application of PCT/NZ2010/000011 filed on Jan. 29, 2010, which claims priority to New Zealand Application No. 575464, filed on Mar. 12, 2009, the entire disclosures of all of which are hereby incorporated herein by reference.

INTRODUCTION

Line dispensing devices, such as auto-belay devices used for climbing, are used to protect against falls by retracting slack when the line is not under load and providing a braking force when the line is loaded, so that the weight on the end of the line is lowered at a safe speed. Several braking systems, such as a friction-brake or hydraulic dampening mechanism, have been utilized in line dispensing devices. These devices typically utilize a clutch to engage and disengage the braking system so that the braking system is completely disengaged from the rest of the device when the line is not under load. While the clutch is an effective mechanism for selectively engaging a braking system, prolonged use of the clutch will wear on the mechanism over time until the clutch is no longer safe and/or effective. Because failure of a clutch often results in the braking system becoming completely disengaged from the rest of the device, clutch failure in line dispensing devices can lead to injury of a user. For example, MSA recently recalled all of their line of Redpoint Decenders due to injury reported to have been caused by clutch failures. Accordingly, line dispensing devices with clutchless braking systems having no or minimal risk of mechanical failure are desirable. This is particularly true when the line dispensing device is a safety device.

SUMMARY

This disclosure describes embodiments of novel line dispensing devices and methods for dispensing and retracting a line of a line dispensing device.

In part, this disclosure describes a line dispensing device. The line dispensing device includes the following elements:
a) a shaft;
b) a rotor, the rotor comprising at least one pivotable member, wherein the rotor is rotatable around the shaft;
c) at least one magnet configured to apply a magnetic field extending at least partially orthogonal to a plane of rotation of the pivotable member;
d) a cradle, the cradle rotatable around the shaft and configured to hold the at least one magnet;
e) a coupling transmission, the coupling transmission coupling the rotor to the cradle and the at least one magnet;
f) a line, the line coupled to the cradle;
g) a retracting mechanism, the retracting mechanism is operatively coupled to the cradle and attached to the shaft at one end of the retracting mechanism; and
h) a housing, the housing containing at least a portion of the shaft, the rotor, the at least one pivotable member, the at least one magnet, the cradle, the coupling transmission, the retracting mechanism, and the line.

Another aspect of this disclosure describes a line dispensing device. The line dispensing device includes the following elements:
a) a shaft;
b) a cradle, the cradle rotatable around the shaft;
c) at least one magnet configured to apply a magnetic field extending at least partially orthogonal to a plane of rotation of the cradle;
d) a rotor, the rotor comprising at least one pivotable member, wherein the rotor is rotatable around the shaft and configured to hold the at least one magnet;
e) a coupling transmission, the coupling transmission coupling the rotor and the at least one magnet to the cradle;
f) a line, the line coupled to the cradle;
g) a retracting mechanism, the retracting mechanism is operatively coupled to the cradle and attached to the shaft at one end of the retracting mechanism; and
h) a housing, the housing containing at least a portion of the shaft, the rotor, the at least one pivotable member, the at least one magnet, the cradle, the coupling transmission, the retracting mechanism, and the line.

Yet another aspect of this disclosure describes a method for automatically feeding and retracting line. The method includes performing the following steps: providing a line for extension and retraction; applying a retraction force to the line with a retracting mechanism; and applying a braking force to the line that provides a substantially constant speed for extension over a range of applied torques by balancing an increase in an applied torque with an equal and opposite increase in a braking torque arising from an induced eddy-current from at least one conductive member intersecting a larger portion of a magnetic field.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the claims.

BRIEF DESCRIPTION OF THE DRAWINGS

The following drawing figures, which form a part of this application, are illustrative of embodiment systems and methods described below and are not meant to limit the scope of the disclosure in any manner, which scope shall be based on the claims appended hereto.

FIG. 4 illustrates an embodiment of a front view of a line dispensing device.

FIG. 5 illustrates an embodiment of an isometric partial cross-sectional view of a line dispensing device.

FIG. 6 illustrates an embodiment of a side cross-sectional view of a line dispensing device.

DETAILED DESCRIPTION

Figure 1:
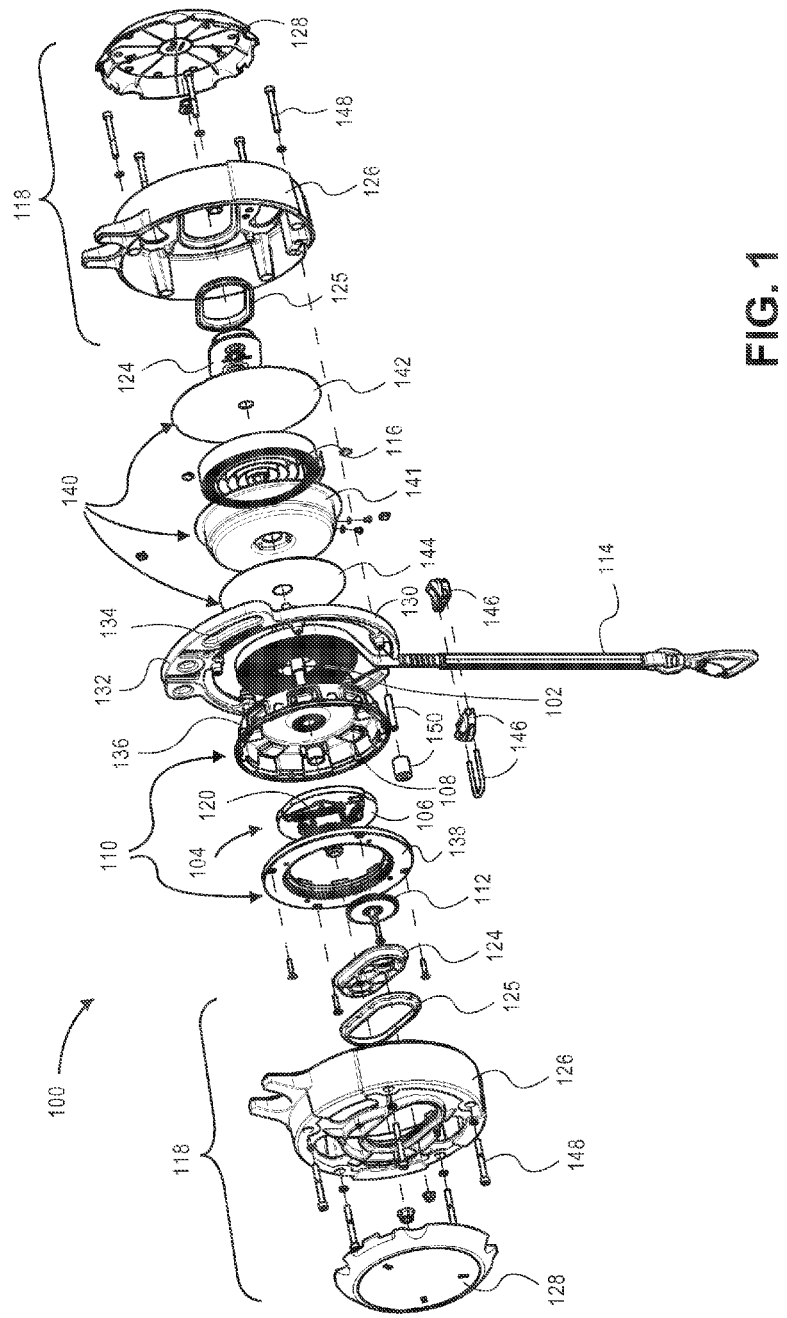
FIG. 1 illustrates an embodiment of an exploded view of a line dispensing device.

This disclosure describes embodiments of novel line dispensing devices and methods for dispensing and retracting a line of a line dispensing device.

In one embodiment an eddy-current braking mechanism includes a rotor, rotatable about a rotor axis; at least one electrically conductive member coupled to the rotor for rotation therewith; at least one magnet configured to apply a magnetic field extending at least partially orthogonal to the plane of rotation of the conductive member; and characterized in that upon rotation of the rotor, the conductive member is configured to move at least partially radially from the rotor axis into the applied magnetic field.

In general, movement of the conductive member through the applied magnetic field induces an eddy-current in the conductive member when the conductive member intersects the magnetic field.

To aid clarity and avoid prolixity, reference herein will be made to the conductive member being coupled to the rotor. However, it will be appreciated that a "reverse configuration" is also possible and within the scope of the disclosure. This "reverse configuration" may have the magnet coupled to the rotor and configured to move toward a conductive member such that the conductive member will intersect the magnetic field.

To aid clarity and to avoid prolixity the braking mechanism will be described herein for an auto-belay. However, it should be appreciated that the braking mechanism may be used in other rotary braking or retarding applications and thus reference herein to an auto-belay is exemplary only and should not be seen to be limiting.

It will also be appreciated that the braking mechanism may also be used in linear braking applications by coupling the rotor to a linear device (e.g. by a cam or chain drive mechanism).

Reference herein to "radial" movement of the conductive member should be understood to include any movement with a component in a direction toward or away from the axis of rotation of the rotor and/or conductive member and should be interpreted to include both linear and non-linear radial movement.

Reference herein to "outward" radial movement refers to movement in a direction away from the axis of rotation and similarly "inward" refers to a direction toward the axis of rotation.

Reference herein to the conductive member being "coupled" to the rotor should be understood to mean any direct or indirect connection such that the conductive member rotates with the rotor. It should also be appreciated that connection need not be mechanical.

The magnetic field applied by the magnet will herein be referred to as the "applied" magnetic field and the magnetic field(s) generated by eddy-currents in the conductive member are referred to as "reactive" magnetic field(s).

In some embodiments the eddy-current induced in the conductive member generates a reactive magnetic field opposing the applied magnetic field. The reactive force generated by the opposing 'applied' and 'reactive' magnetic fields is thus transferred to the conductive member to oppose movement thereof. As the conductive members are coupled to the rotor, the rotation of the rotor is also opposed by the reactive force.

As used herein, the terms "brake" or "braking" respectively refer to any apparatus or process for applying a force opposing movement of an object.

As used herein, the term "rotor" refers to any rotatable element and may include a driveshaft, axle, gear, screw, disc, wheel, cog, combination thereof or any other rotatable member.

As used herein, the term "conductive member" refers to any electrically conductive, preferably non-ferrous member.

As used herein, the term "magnet" refers to any magnet or device capable of generating a magnetic field and may include electromagnets, "permanent" magnets, "temporary" magnets, magnetized ferromagnetic materials, or any combination thereof.

The conductive member may be configured to move at least partially radially from the rotor axis into the magnetic field.

The conductive member may rotate with the rotor about the rotor axis.

It should be appreciated that the conductive member need not be directly connected to the rotor and could instead be connected via intermediate gears or other couplings. In such embodiments, the gear or coupling attached to the conductive member can be considered the "rotor" or part thereof.

It should also be appreciated that in such embodiments where the conductive member is indirectly coupled to the rotor, the conductive member may rotate about another axis parallel or non-parallel to the rotor axis.

In a further embodiment, the rotor may be coupled to a shaft or the like via an overdrive, or underdrive, gear transmission arrangement, such that the rotor rotates at a different speed to that of the shaft.

In one embodiment, the rotor is coupled to a spool of line and configured for rotation therewith. Thus, the rate of line dispensing, or retracting, from the spool can be controlled by controlling the speed of rotation of the rotor with the braking mechanism.

In an embodiment, the braking mechanism includes a plurality of electrically conductive members (henceforth referred to simply as conductive members).

The braking effect may be increased by increasing the number of conductive members moving through the applied magnetic field. However, the number and size of the conductive members will be limited by the size and weight constraints of the application. Thus, for example, in auto-belay applications, preferably three said conductive members are provided.

In an embodiment, the conductive member is pivotally attached to the rotor and configured to pivot about a pivot axis to move at least partially radially into the applied magnetic field upon rotation of the rotor.

In one embodiment, the conductive member is pivotally attached to the rotor at a point eccentric to the rotor axis.

The conductive member may have a center of mass (or mass centroid) eccentric to the pivot and rotor axes. The conductive member will thus pivot as a result of torque applied to the conductive member by the rotor via the pivot connection and by centrifugal effects acting on the conductive member which are centered at the center of mass. The strength of centrifugal effect is dependant on the rotor speed, thus the conductive member will move radially at a rate dependant on the rotor speed.

In another embodiment, the center of mass (or mass centroid) may be located at the pivot axis. For example, the conductive member may be shaped with a counter balance arrangement with an even mass distribution about the pivot axis. Such an embodiment provides a transfer of radial force directly about the pivot axis and as such does not apply a movement to the arm about the pivot axis. Therefore the braked response in this embodiment is independent of the radial force acting on the arm mass.

It should be appreciated that the conductive member may be of any shape suitable for the application. The shape of the conductive member determines the area of magnetic field intersected by the conductive member when moving radially into the magnetic field, the eddy-currents and reactive magnetic field generated, and therefore the corresponding braking torque. The shape of the conductive member may be modified to modify the braking torque characteristics required for an application.

In an embodiment, one end of a biasing device, such as a spring or other biasing device/mechanism, is attached to the conductive member at a point distal to the pivot axis and the other end to the rotor at a position to provide a bias opposing the radial movement of the conductive member resulting from rotor rotation. Calibration of the biasing device thus provides a means for controlling the amount of radial movement of the conductive member relative to angular velocity and therefore the area of conductive member intersecting the applied magnetic field at any particular angular velocity. The braking force applied to the conductive member during movement through the applied magnetic field may also be applied to the rotor via the biasing device and/or through the attachment of the conductive member to the rotor.

In one embodiment, the biasing device includes a calibration mechanism capable of selectively increasing and/or decreasing the level of biasing device bias applied. Such a calibration mechanism may, for example, be provided by a tensioning screw that is capable of reversibly contracting/extending a spring to thus adjust the biasing device bias applied. Such a tensioning screw may prove useful in calibrating the braking mechanism quickly and easily without requiring disassembling to adjust or replace the biasing device. In auto-belay applications such quick calibration may prove important where it is necessary to change the maximum rotation speed required.

It will be appreciated that the biasing device may be configured to bias the conductive member toward or away from the applied magnetic field depending on the requirements of the respective application. For example, in applications requiring increasing braking torque to counter increasing applied torque (to prevent acceleration), the biasing device preferably biases the conductive member radially out of the applied magnetic field.

In an alternative embodiment, (for applications requiring a decreasing rate of braking torque with respect to speed) the biasing device may be attached to the conductive member and to the rotor to provide a bias to the conductive member to move the conductive member radially into the applied magnetic field. The conductive member may be configured to move radially inward on rotation, e.g. by providing a counterweight or positioning the mass centroid on an opposing side of the pivot axis to the biasing device attachment. Such an embodiment may be achieved, for example, by providing a conductive member on one end of a lever pivotable about an intermediate point, the other lever end having a counterweight configured to move outwardly under centrifugal effects when the rotor rotates. The conductive member, or alternatively the counterweight, may be attached to the rotor via a biasing device to bias the conductive member towards the applied magnetic field. Therefore, as the rotor rotates, the lever will pivot the conductive member away from the magnetic field against the bias and braking torque applied to the conductive member.

In one embodiment, the biasing device is attached to the rotor at a position spaced from the eccentric pivot axis in the direction of rotation to be braked.

In an alternative embodiment, the biasing device may be provided as a torsion spring or similar attached at one end to the rotor and at the other end to the conductive member about the pivot axis, the torsion spring configured to oppose pivoting of the conductive member toward or away (depending on the application) from the magnetic field.

The aforementioned spring configurations constrain the pivoting range of the conductive member between the maximum and minimum spring extension, preferably with, respectively, the maximum and minimum area of conductive member intersecting the applied magnetic field.

The pivoting range is also preferably constrained to one side of the pivot axis to ensure that the braking torque is only applied in one rotation direction and not the opposing direction. Such a 'unidirectional' configuration is useful in auto-belay applications where it is undesirable to have a braking effect on the line when ascending, as this will oppose the line retraction mechanism and potentially create slack in the line.

The rate at which the conductive member moves toward the magnetic field is dependant on the applied torque, spring bias and the reactionary centrifugal force acting on the conductive member, i.e. the conductive member will move toward the magnetic field if the component of applied torque and centrifugal force (dependant on rotation speed and conductive member mass) opposing the spring bias is greater than the spring bias. As the spring extends, the "spring" bias or restoring force $F_s$ increases approximately according to $F_s=kx$ where k is the spring constant and x is the extension from equilibrium. Once the conductive member is in the magnetic field; the eddy-current reactive force will be added to the pivoting caused by the applied torque and centrifugal force, the spring bias thus opposes all three forces and the spring will therefore extend until the restoring force equals the torque applied to the conductive member about the pivot axis.

In an embodiment, the braking mechanism includes a plurality of permanent magnets arranged in a generally circular or arcuate magnet array, concentric with the rotor.

In an alternative embodiment, the braking mechanism may include a plurality of permanent magnets arranged in a linear array, for example, in a square or triangular array with the rotor axis generally in the center thereof.

In one embodiment, two said arrays are provided on opposing sides of the plane of rotation of the conductive member, the magnets of each array having opposite poles substantially opposing each other. A magnetic field is thus created that extends between the opposing poles (North opposing South) of opposing magnets, preferably, in a direction substantially perpendicular to the plane of rotation of the conductive member.

In an alternative embodiment, one array may be provided on one side of the rotor and a steel or ferromagnetic plate located on the other side. However, it will be appreciated that such a "one-sided" magnetic array may provide a weaker magnetic field than a comparative two-sided array.

In a further embodiment, the magnet array provided on one or both sides of the conductive member may be arranged in a Halbach, or similar configuration to focus the magnetic field in the direction of the conductive member.

In an embodiment, the magnet array is provided with a steel or other ferromagnetic backing attached to a surface of the magnets on an "outer", opposing side to the conductive member.

In yet another embodiment, the magnet may be provided as a single magnet shaped to encircle the rotor and conductive member, such that radial movement of the conductive member will result in the conductive member intersecting the applied magnetic field.

It will be appreciated that in order for an eddy-current effect to be generated, the conductive member must intersect and move relative to the magnetic field. By way of example, this may be achieved by:

a) fixing the magnet in position and rotating the rotor and conductive member such that the conductive member intersects and moves through the magnetic field and vice versa; or b) rotating both the conductive member and the magnet, but at differing angular velocity, e.g. the rotor and conductive member may be configured to rotate in the same direction as the magnet but at a greater angular velocity, or alternatively, the magnet may be configured to rotate in the opposite direction to that of the conductive member.

Thus, in one embodiment, the magnet is fixed in position such that it does not rotate with the rotor, the rotor and conductive members rotatable relative to the magnet such that the conductive member intersects and moves through the magnetic field. It should be appreciated that the term "fixed" as used in this embodiment refers to a magnet being static relative to the rotor, e.g. similar to a motor stator. Thus, the term "fixed" should not be interpreted to mean the magnet is fixed in position relative to any housing, superstructure or other objects.

In an embodiment, the magnet is configured to rotate upon rotation of the rotor at a different angular velocity to that of the rotor.

Rotation of the magnet(s) relative to the rotor as the rotor is rotating provides a mechanism for varying the relative angular velocity and hence the strength of the braking torque. The magnet(s) may be rotated in the same direction as the rotor to reduce the braking torque or in the opposite direction to increase it.

In an another embodiment, the magnet is coupled to the rotor for rotation therewith in a substantially opposing direction to that of the rotor.

In a further embodiment, the rotor is coupled to the magnet via a coupling transmission.

In this embodiment, a coupling transmission may be used to alter the relative angular velocity of the rotor (and conductive member) relative to the magnet, where the applied torque drives a cradle connected to the magnets and coupled to the rotor via a coupling transmission. In alternate embodiments, the arrangement may be the other way round.

Reference to a coupling transmission throughout this specification should be understood to refer to a mechanism used to transmit power between two articles to which it is coupled. A coupling transmission may be a mechanical or fluid gear transmission, or a chain drive or friction coupling, or by any other such transmission as are well known to those skilled in the art.

For example, a gear transmission may be configured to rotate the magnet(s) in the opposing direction to that of the rotor, thereby potentially multiplying the relative velocity between the conductive member and magnet.

This braking mechanism may thus achieve an increased braking effect by increasing the relative speed between the conductive member and magnet, without a significant increase in materials or size.

In other embodiments the rotor is coupled to the magnet by a variety of means, including by a chain drive or a friction coupling.

In a further embodiment, a stop may be provided for limiting the range of radial movement of the conductive member.

Preferably, the stop is positioned to limit the radial movement of the conductive member to a position of maximum magnetic field intercepted.

Such a stop can be utilized to transfer the braking force applied to the conductive member to the rotor by effectively "fixing" the conductive member with respect to the rotor while the conductive member is in the magnetic field.

Furthermore, provision of such a stop provides a "safety" feature to ensure that if the biasing device breaks, detaches or otherwise fails, the conductive member will still apply a braking torque (preferably maximum) to the rotor. Without such a stop, the conductive member may move out of the magnetic field and no longer apply a braking torque.

In an alternative embodiment, the stop may be provided as part of a biased ratchet mechanism, the conductive member moving against the bias to progressive radial positions and thus progressive levels of braking torque.

In one embodiment, an eddy-current braking mechanism includes: a rotor, rotatable about a rotor axis: at least one electrically conductive member coupled to the rotor for rotation therewith; at least one magnet configured to apply a magnetic field extending at least partially orthogonal to the conductive member; and characterized in that upon rotation of the rotor, the conductive member is configured to move radially outward from the rotor axis into the applied magnetic field, movement of the conductive member through the applied magnetic field thereby inducing an eddy-current in the conductive member when the conductive member intersects the magnetic field.

In an embodiment, the magnetic field primarily extends substantially orthogonally to the plane of rotation of the conductive member.

In another embodiment, a plurality of magnets and conductive members are provided, each conductive member capable of reversible movement into a magnetic field applied by one or more of the magnets.

In yet another embodiment, the conductive member is configured to move with respect to the rotor along a radial track from the rotor axis in response to rotation of the rotor.

In one embodiment, the conductive member is configured to move into the magnetic field as a result of radial acceleration applied by the coupled rotor, the conductive member thus moving radially outward with respect to the rotor.

In a further embodiment, a biasing device, such as a spring or equivalent biasing device/mechanism is attached to the conductive member and to the rotor to provide a bias opposing the outward radial movement of the conductive member. Calibration of the biasing device thus provides a means for controlling the rate of radial movement of the conductive member and therefore the area of conductive member intersecting the magnetic field.

This "linear" embodiment thus provides a braking mechanism that works independent of the direction of rotation of the rotor.

The configuration of the braking torque applied to both the "linear" and "pivoting" (i.e. with pivoting conductive member) embodiments can be modified and calibrated by changing the level of bias thereby providing an effective means of accommodating applications requiring specific braking torque profiles.

Existing auto-belay systems typically use a friction-brake or hydraulic dampening mechanism to control the descent rate. Friction-brakes clearly have disadvantages compared with eddy-current brakes as the frictional contact involves substantial heat generation, wear and corresponding safety problems. Hydraulic dampening mechanisms are expensive and vulnerable to leaks, pressure and calibration problems.

An ideal auto-belay system would provide a constant or controllable descent rate with minimal friction and corresponding wear while also providing sufficient braking force in a small compact device.

Figure 14:
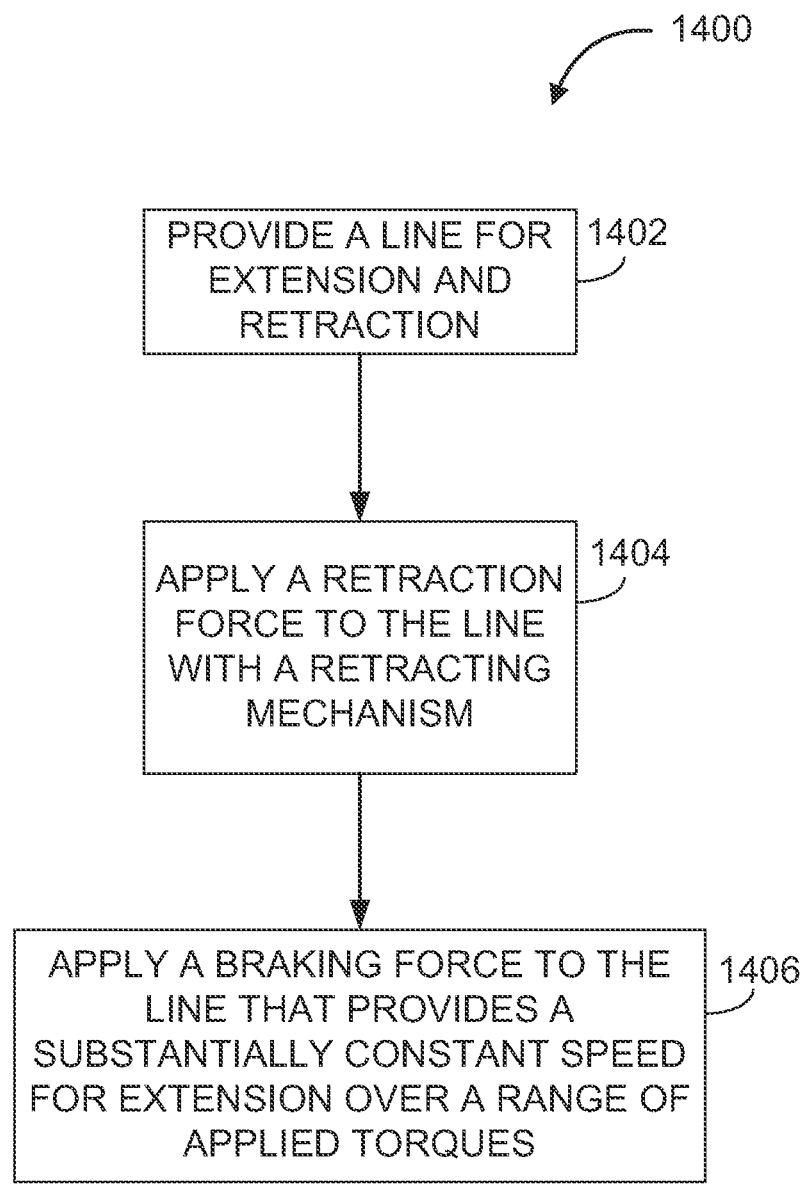
FIG. 14 illustrates an embodiment of a method for dispensing and retracting a line of a line dispensing device.
Figure 15:
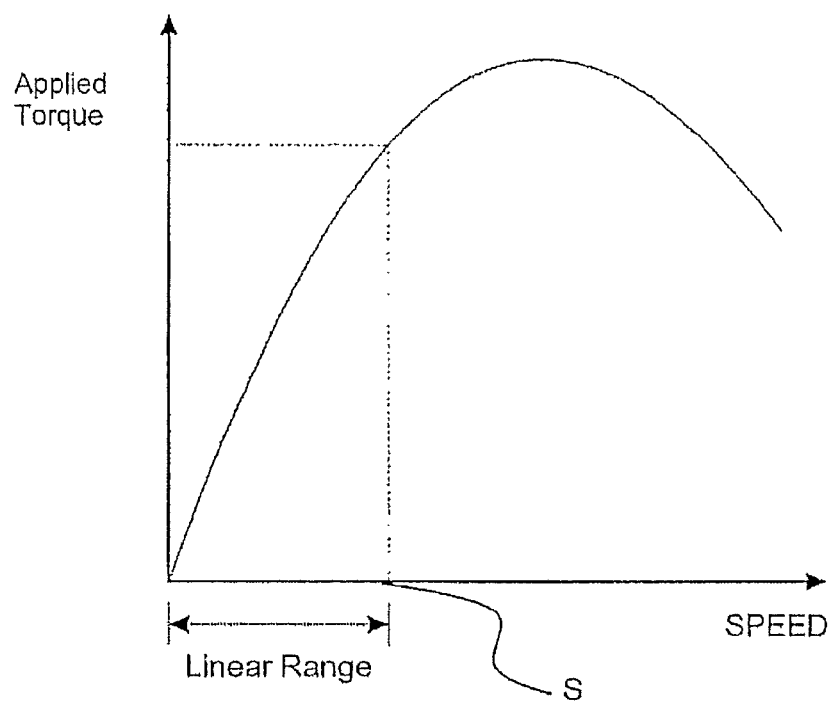
FIG. 15 illustrates and embodiment of a plot of Torque vs. Speed for an exemplary prior art eddy-current braking mechanism.

The prior art is replete with various eddy-current braking systems. However, none of the prior art systems appear suitable for application in an auto-belay or other applications where a constant speed of rotation is required where the torque applied may vary. This characteristic of prior art systems is illustrated in FIG. 14 which shows an approximate plot of braking torque against rotation speed for a typical disc-type eddy-current braking system.

An eddy-current braking mechanism as described herein may be configured such that the speed of rotation of the rotor is constant over a range of applied torques (the "operating range"), the applied torque being the force applied to the rotor causing it to rotate. This constant speed of rotation may arise due to any increase in the applied torque (in the operating range) being balanced by an equal and opposite increase in the braking torque arising from the induced eddy current as the conductor intersects more of the magnet field.

Thus, when the rotor initially begins to rotate, the speed of rotation of the eddy-current braking mechanism increases substantially linearly with the applied torque. This situation continues until the electrical conductor, which is coupled to the rotor to rotate with it, enters the applied magnetic field of the magnet. Movement of the conductor through the magnetic field induces eddy currents in the conductor which oppose the motion through the magnetic field, thus providing a braking force on the motion of the conductor. The magnitude of the braking force depends on a number of factors, including the degree to which the conductor intersects the magnetic field and the strength of the field.

In an eddy-current braking mechanism as described herein the strength of the magnetic field, configuration of the conductor, and the biasing mechanism, may all be chosen such that an increase in torque applied to the rotor is balanced by an equal and opposite increase in braking torque throughout the required operating range of torque, at a constant speed of rotation of the rotor throughout the operating range.

At some applied torque the conductor may intersect the maximum area of magnetic field available under the particular embodiment of the braking mechanism. At this torque the braking force is also at a maximum. Therefore, as the applied torque is increased further, the speed of rotation will again become substantially linear with respect to the increase in applied torque.

In one embodiment, a line dispensing device includes: a braking mechanism substantially as hereinbefore described, and a spool of line coupled to the rotor and/or conductive member for rotation therewith.

In an embodiment, the line dispensing device is an auto-belay.

In another embodiment, the rotor and/or spool includes a biased retracting mechanism for opposing extension of line from the spool, the retracting mechanism configured to retract the line when tension applied to the line falls below a predetermined level.

As used herein, the term "line" refers to any cable, rope, string, chain, wire, webbing, strap or any other length of flexible material.

In an embodiment, a method of braking rotation of an object includes the steps of: coupling a conductive member to the object for rotation therewith; providing at least one magnet configured to apply a magnetic field extending at least partially into the plane of rotation of the rotatable conductive member; and configuring the conductive member to move into the magnetic field upon rotation of the object.

In one embodiment, the method of braking rotation of an object substantially as hereinbefore described, includes the further step of rotating the object to thus move the conductive member into the magnetic field; the magnetic field thereby inducing an eddy-current in the conductive member.

The braking mechanism as described herein provides significant advantages over the prior art by providing an eddy-current braking mechanism capable of one or more of:
  limiting the speed to a constant level over a range of applied torques;
  applying sufficient braking torque using a compact apparatus; and
  providing an eddy-current brake for use with auto-descenders/auto-belays.

Further, the braking mechanism as described herein provides significant advantages over the prior art by providing an eddy-current braking mechanism that does not require the use of a clutch.

It will be appreciated that the braking mechanism as described herein may therefore find particular use for speed control and/or braking in numerous applications, such as, by way of example, speed control of:
  a rotor in wind, hydro, and other rotary turbines;
  exercise equipment, e.g. rowing machines, epi-cyclic trainers;

roller-coasters and other amusement rides;
elevator and escalator systems;
evacuation descenders and fire-escape devices;
conveyor systems;
rotary drives in factory production facilities;
materials handling devices such as conveyor belts or a braking device in a chute for example, or to control the descent rate of an item down a slide;
dynamic display signage, e.g. in controlling the rotation speed of rotating signs;
roadside safety systems, e.g. the brake may be connected in a system; and
to provide crash attenuation through the dissipation of energy in the brake.

Indeed, the braking mechanism as described herein may be used in any rotary braking and/or speed limiting system.

FIGS. 1-13 illustrate embodiments or portions of a line dispensing device 100. The line dispensing device 100 does not include a clutch and the braking mechanism is permanently connected to and rotates in response to all retraction and extension of the line 114. As illustrated in FIG. 1, the line dispensing device 100 includes a shaft 102, a rotor 104, pivotable members 106 (three are shown) attached to the rotor 104, a cradle 110 with attached magnets 108, a coupling transmission 112, a line 114, a retracting mechanism 116, and two housing panels 118. In one embodiment, the line dispensing device 100 is an auto-belay device for allowing a climber to climb and safely be lowered when hanging on the line 114. In the embodiment shown, the line dispensing device 100 further includes a biasing device 120, a biasing device attachment 122, an isolation insert 125, a central plate 130, a handle 134, a cradle drum 136, a cradle plate 138, a mechanical connection 154, a nozzle 146, a retracting mechanism drum 141, a retracting mechanism base plate 142, a retracting mechanism inner drum plate 144, a connecting mechanism 148, a guide roller 150, and a line attachment site 152.

When assembled, the outside of the line dispensing device 100 of FIG. 1 is defined by two housing panels 118 connected to either side of a central plate 130. Together, these components act as a housing to surround and protect the internal components of the device 100. In the embodiment shown, each housing panel 118 includes a side component 126 and a side plate 128. The side components 126 may be identical as shown to reduce manufacturing costs. The two side components 126 may be held together with one or more bolts 148 as shown, or any other suitable connecting mechanism 148.

In the device 100 in FIG. 1, each of the two side components 126 is connected to a side plate 128. The side plate 128 may be considered a wear point and designed to be cheap and easily replaceable in order to maintain the appearance of the device 100 when in prolonged use. The side plates 128 may be attached to the side component 126 in any way. In the embodiment shown, the side plates 128 include clips for attaching the side plates 128 to the side component 126. The clips may aid in attachment and provide stability to the side plates 128. Preferably, the side plates 128, and indeed all components of the housing and device 100 in general, should be positively attached so that noise from vibration is reduced.

The side plates 128 are particularly advantageous when used in auto-belay systems for climbers. The side plates 128 cover any sharp edges found within the line dispensing device 100. Auto-belay systems often rub against or contact climbing walls during use. The side plates 128 prevent a line dispensing device 100 from damaging the climbing wall during such contact.

In the embodiment shown, each housing panel 118 is roughly cylindrical and provided with two prongs that extend from the side. These prongs surround and direct the eyes of a user to a central mounting aperture in the mounting point 132 of the central plate 130. This is desired in order to visually direct the users to the preferred mounting aperture by giving the impression that the central aperture is the strongest attachment point.

In the embodiment shown, the central plate 130 acts a central frame for the device 100 from which the other components are hung and through which the device 100 is attached to a fixed anchor for use. The central plate 130, as shown, is a unitary component made of metal or other suitably strong material and includes an integral mounting point 132 that has three separate apertures, any one (or more) of which can be used as the attachment point for the device 100. It should be noted that this is just one method for providing an attachment point and, in alternative embodiments, the mounting point 132 may be a portion of a housing panel 118 or may be separate, removable component that can be attached to the device 100.

In the embodiment shown, the mounting point 132 includes a main mounting aperture 131 (flanked by the two prongs of each side component 126), an alternate mounting aperture 133, and a handle 134 on either side of the main mounting aperture 131. Depending on the needs of the user, any number, shape and configuration of apertures can provided. However, the mounting point 132 as shown in FIG. 1 has several advantages. The multiple mounting apertures allows for a back-up or secondary line to be run through the alternative mounting aperture to secure the line dispensing device 100 if the primary mounting fails. The multiple apertures allow for equi-tensioned multiple point mounting as is preferred in some climbing gyms. Because the handle 134 is offset from the mounting aperture, it provides a means for holding the line dispensing device 100 during mounting that is separate from the mounting aperture. This is a benefit over other devices that provide only one mounting aperture that also serves as a handle which require the operator mounting the device 100 to let go of the handle when mounting the device 100.

As discussed above, in one embodiment, the line dispensing device 100 includes a central plate 130. The central plate 130 is a hollow component located at or near the center of the line dispensing device 100. As discussed above, the central plate 130 may include the mounting point 132. In one embodiment, the shaft 102 extends through the central plate 130. The shaft 102 may further extend through the center of a spool of line 114.

The shaft 102 provides the axis of rotation about with the line 114 is coiled and uncoiled during use. In the embodiment shown, the shaft 102 is fixed and extends through the rotor 104, the cradle 110, and the retraction mechanism 116. The rotor 104 and the cradle 110 rotate around the shaft 102. In the embodiment shown, a portion of the retraction mechanism 116 also moves around the shaft 102. In an alternative embodiment, not shown, the rotor 104, the cradle 110, and/or the retraction mechanism 116 do not rotate around the shaft 102, but instead rotate around an axis parallel to the shaft 102.

In the embodiment shown, each end of the shaft 102 is mounted to a housing panel 118. Furthermore, each end of the shaft 102 is anchored to its respective housing panel 118 using a flexible isolation insert 125 that fits into an aperture provided in the side component 126 (or, more precisely in the case of the embodiment illustrated in FIG. 1, between an oval plate 124 and the side component 126). The isolation insert 125 may be made of rubber or any other suitable material and is preferably flexible. The isolation insert 125 reduces noise produced by the line dispensing device 100 and dampens vibrations during use.

In one embodiment, the isolation insert 125 fastens to an oval plate 124. The oval plate 124 feeds into the housing panel 118 and is retained in the interior of the device 100 by a flange. The attachment of the isolation insert 125 with an oval plate 124 and a flange provide a safety feature. In this configuration, even if the isolation insert 125 fails, the shaft 102 will remain trapped within the housing panel 118 as even without the isolation insert 125 the oval plate 124 can not be removed from the device 100 without first removing the housing panel 118. This is important in that the isolation insert 125 is anticipated to degrade over time as it flexes and wears in response to the vibrations created during use. Operators of the device 100 will be alerted to wear of the isolation insert 125 by an increase in noise from the device 100, giving an audible cue to the operator to service the device 100.

In the embodiment shown, the line dispensing device 100 includes two identical isolation inserts 125 mounted in the same position on opposite sides of the housing panel 118. The utilization of identical isolation inserts 125 may allow for cost effective manufacturing of this component. Furthermore, in the embodiment shown, the isolation insert 125 anchors a portion of the coupling transmission 112 as the transmission is also attached to the oval plate 124 through an idle shaft 113 connected to an idle gear 111 of the coupling transmission 112, as illustrated in FIG. 1 (see also FIG. 12). In the embodiment shown, only one isolation insert 125 will anchor the coupling transmission 112; however, the other isolation inserts (not shown), may be provided at different locations within the device 100 in order to further dampen vibration, reduce noise and reduce wear.

Figure 9:
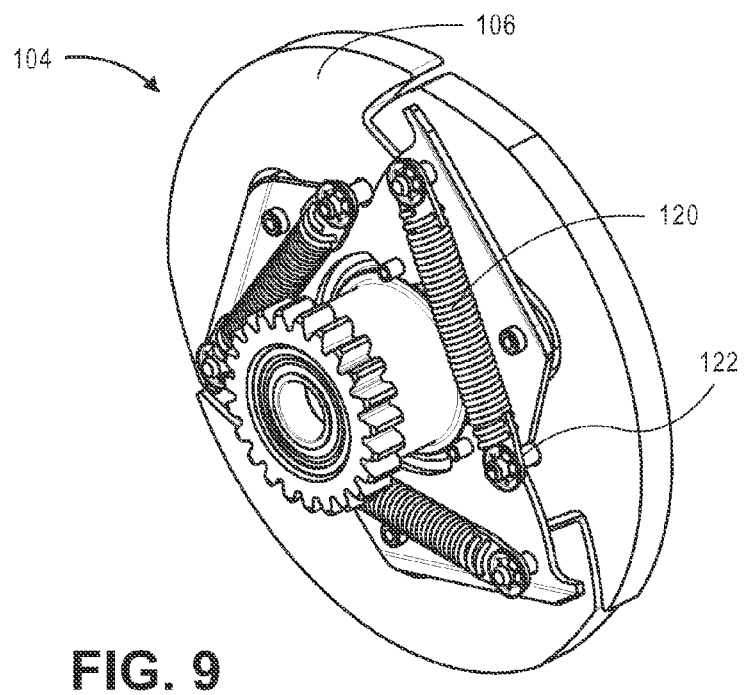
FIG. 9 illustrates an embodiment of an isometric view of a rotor for a line dispensing device.
Figure 10:
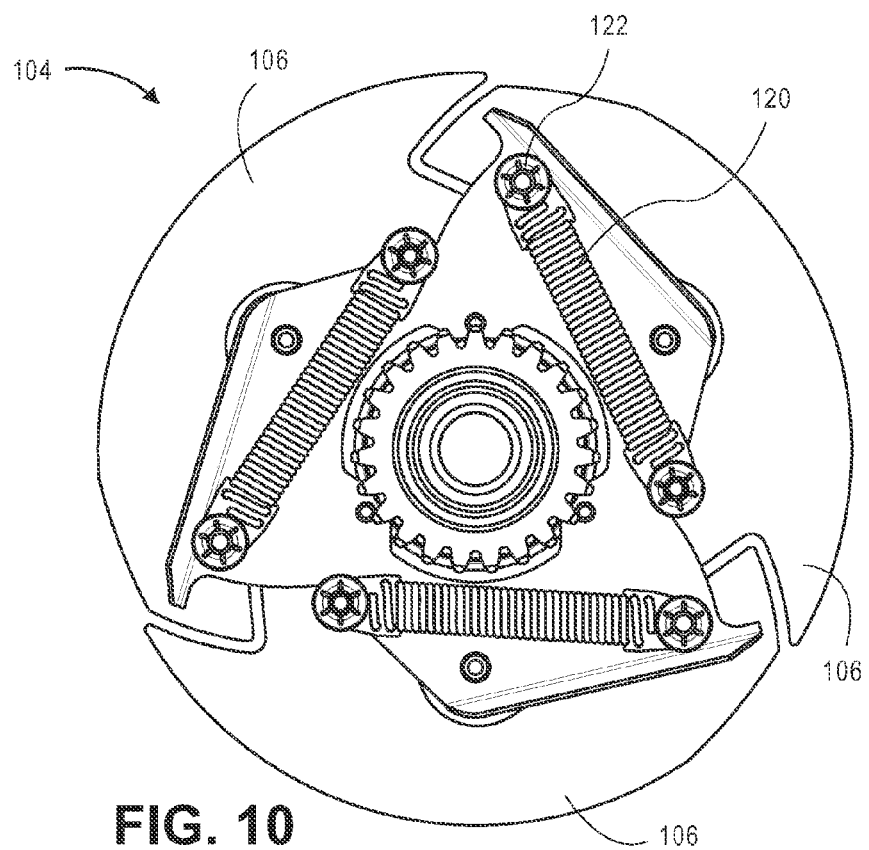
FIG. 10 illustrates an embodiment of a side view of a rotor for a line dispensing device.
Figure 11:
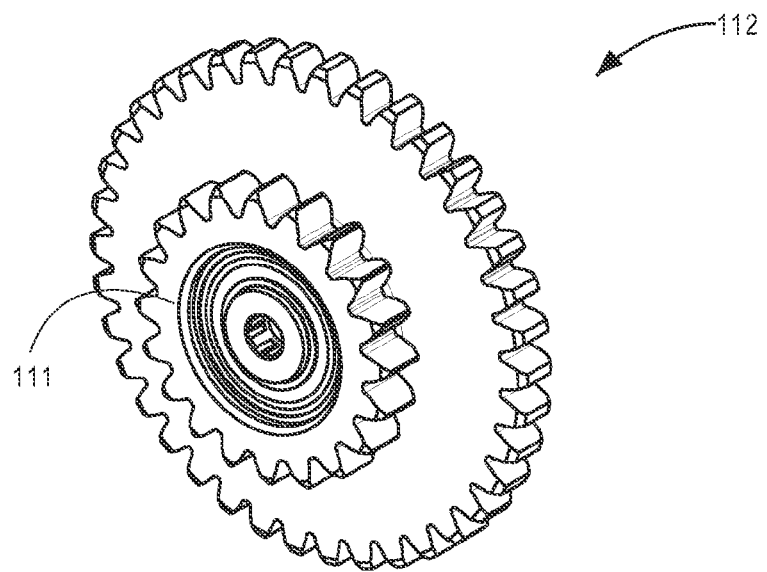
FIG. 11 illustrates an embodiment of an isometric view of a coupling transmission for a line dispensing device.
Figure 12:
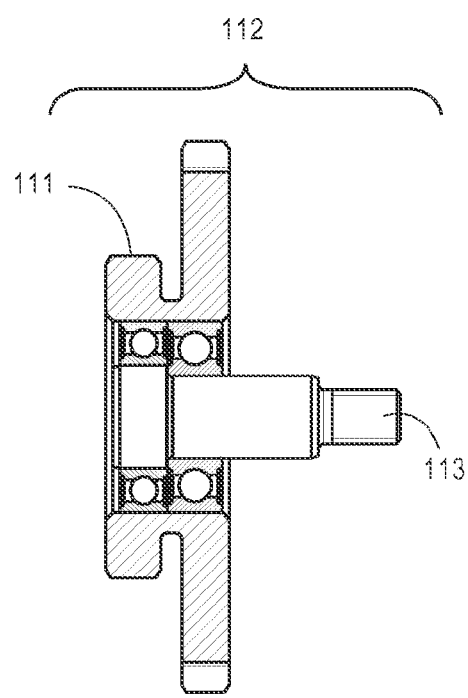
FIG. 12 illustrates an embodiment of a cross-sectional view of a coupling transmission for a line dispensing device.

Turning now to the braking mechanism of the device 100, as discussed above the braking mechanism includes a rotor 104 that spins within a chamber created by the cradle drum 136 and the cradle plate 138. The rotor 104 includes pivotable members 106 (in the embodiment illustrated there are three pivotable members 106, although any number of members such as one, two, four, five, six etc. and any suitable member shape and configuration may be used). In the embodiment shown each pivotable member 106 is pivotally attached to the rotor 104. A line 114 is directly or indirectly coupled to the rotor 104 and, thus, the pivotable members 106. Accordingly, as the line 114 extends or retracts, the rotor 104 and the pivotable members 106 rotate about the axis created by the shaft 102. As the rotor 104 rotates, centripetal force pushes on the pivotable members 106. The amount of centripetal force acting upon the pivotable members 106 increases as the speed of the rotation of the rotor 104 increases. The pivotable members 106 are configured to pivot and/or extend upon rotation in either direction. In an embodiment, with more than one pivotable member 106, the pivotable members 106 are configured to nest together when the rotor 104 is stationary, as illustrated in FIGS. 9 and 10. In another embodiment, the outer edges of the pivotable members 106 are arc-shaped. The nesting configuration for the pivotable members 106 allows the pivotable members 106 to pivot and extend outward when the rotor 104 is rotating in either direction.

The rotor 104 is positioned within the cradle 110. In one embodiment, the cradle 110 is configured to position and hold the magnets 108 and the rotor 104 is a conductive member. In an alternative embodiment, not shown, the cradle 110 is a conductive member and the rotor 104 is configured to hold magnets 108. The magnets 108 are positioned to apply a magnetic field extending at least partially orthogonal to a plane of rotation of the conductive member. In either embodiment, the component holding the magnet 108 are made of a material that provides for low or no resistance to the magnetic field created by the magnets 108. Accordingly, depending upon the configuration, the conductive member may be the pivotable members 106 or the cradle 110. As the pivotable members 106 of the rotor 104 expand, a larger portion of the conductive member enters the magnetic field. This interaction with the magnetic field acts as a braking mechanism causing the cradle 110 and the rotor 104 to slow, which causes the coupled line 114 to slow as well.

In one embodiment, the pivotable members 106 are retracted with a biasing device 120. The biasing device 120 may continuously apply a biasing force toward a nested position of the pivotable members 106. The biasing device 120 may be any suitable retracting device, such as a spring or elastic band. In another embodiment, the biasing device 120 may be attached to the pivotable members 106 with a biasing device attachment 122, as illustrated in FIGS. 9 and 10. In one embodiment, the biasing device 120 includes a calibration device (not shown), which allows the amount of biasing force applied by the biasing device 120 to be adjusted as desired. Accordingly, the biasing device 120 is adjustable to provide for a desirable braking force based on the end use of the line dispensing device 100. The biasing device 120 increases the amount of rotational/centripetal force necessary to expand and/or pivot the pivotable members 106.

In one embodiment, the cradle 110 includes a cradle drum 136 and cradle plate 138. In one embodiment, the magnets 108 are on only one side of the rotor 104. In an alternative embodiment, the magnets 108 include at least two magnets 108 that are positioned on two sides of the rotor 104. In one embodiment, the at least two magnets 108 are attached to the cradle drum 136 and the cradle plate 138. In an alternative embodiment not shown, the magnets 108 include a plurality of magnets 108. The plurality of magnets 108 may be positioned on one or two sides of the pivotable member 106 and/or rotor 104. In an embodiment, the magnets 108 on the cradle drum 136 are symmetrical with or positioned identically to the magnets 108 on the cradle plate 138.

In one embodiment, when the rotor 104 is stationary, the rotor 104 is already partially within the magnetic field of the magnets 108 on the cradle 110. This configuration applies a constant braking force to the line 114 during line retraction. Accordingly, the braking mechanism is always engaged regardless of whether the line 114 is being retracted or fed out in this embodiment. Furthermore, in an embodiment the constant braking force may be adjusted to allow for relatively faster or slower rates of retraction depending on the needs of the operator.

Figure 8:
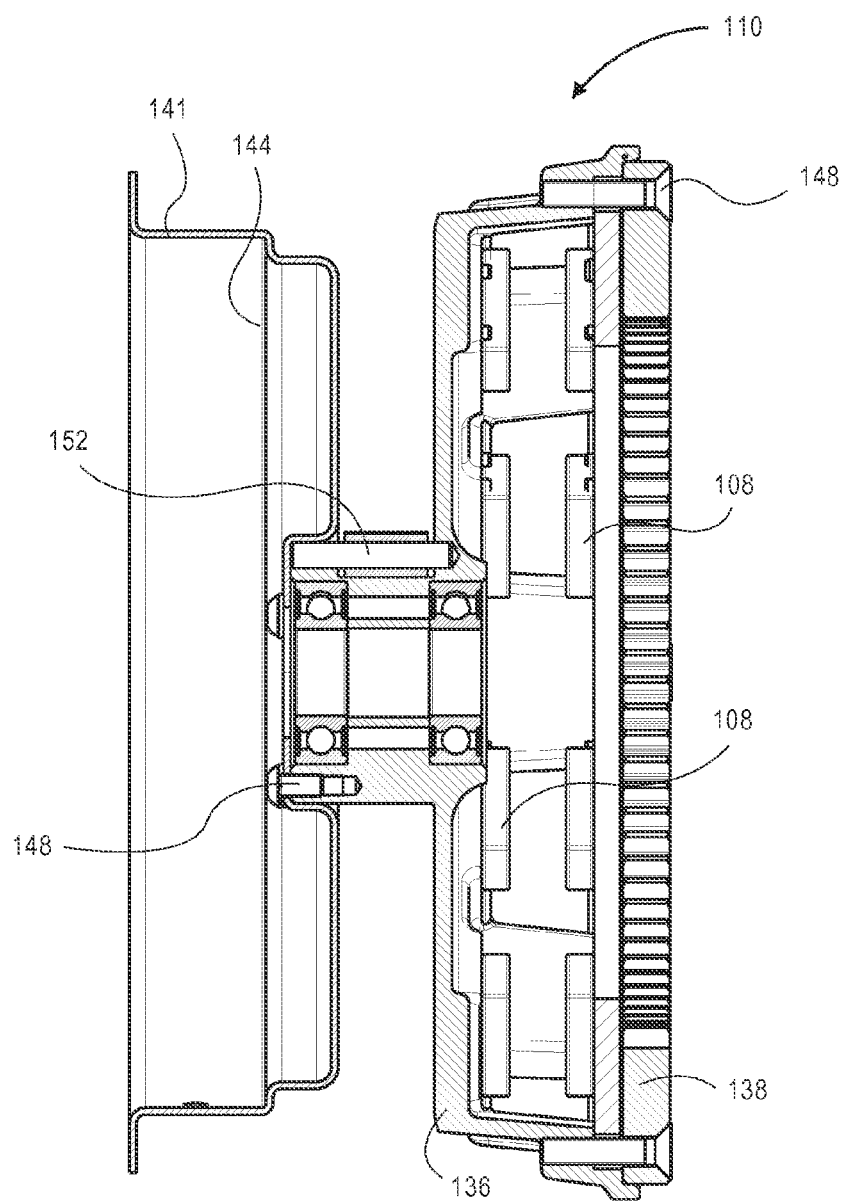
FIG. 8 illustrates an embodiment of a front cross-sectional view of a configuration of a cradle, magnet arrangement, and retraction mechanism drum of a line dispensing device.

As illustrated in FIGS. 1 and 8, the cradle 110 is coupled to the coupling transmission 112 and the line 114 at the line attachment site 152. In the shown embodiment, the cradle plate 138 of the cradle 110 interacts with the coupling transmission 112. The cradle plate 138 includes teeth that interact with the coupling transmission 112. Further, as shown in FIG. 8, the cradle drum 136 includes a center portion that extends towards the retraction mechanism 116. The extension of the cradle drum 136 is attached to the retracting mechanism drum 140 via a connecting mechanism 148, such as a screw or bolt system. The extension of the cradle drum 136 further includes the line attachment site 152. In one embodiment, the line attachment site 152 is a bar or pin. In the embodiment illustrated, the cradle 110 and the retraction mechanism drum plate 141 are fixed together and form a spool portion between them to which the line 114 is attached and around which the line 114 is wound.

Figure 3:
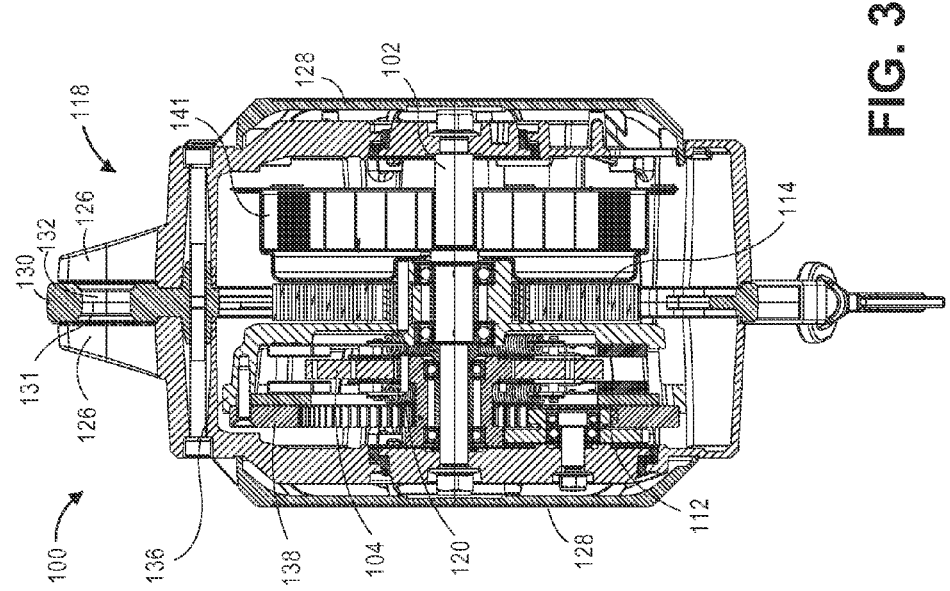
FIG. 3 illustrates an embodiment of a front cross-sectional view of a line dispensing device.

As shown in FIGS. 1 and 3, the coupling transmission 112 couples the rotor 104 to the cradle 110 and, thus, the line 114 since the spool and the cradle 110 are directly connected. In the embodiment shown, the extension of the line 114 causes the cradle 110 to rotate in a first direction. The retraction of the line 114 by the retraction mechanism 116 causes the cradle 110 to rotate in a second opposite direction. Accordingly, the rotational speed of spool around which the line 114 is wound and the rotational speed of the cradle 110 will be the same. The rotation of the cradle 110 interacts with the coupling transmission 112 and causes the coupling transmission 112 to move. In one embodiment, the movement of the coupling transmission 112 causes the rotor 104 to rotate in the opposite direction of the cradle 110. In an alternative embodiment, the movement of the coupling transmission 112 causes the rotor 104 to rotate in the same direction as the cradle 110 but at a different speed.

In one embodiment, the coupling transmission 112 is a mechanical or fluid gear transmission system. In another embodiment, the coupling transmission 112 is a mechanical or fluid chain drive or friction coupling transmission system or any other such transmission as is well known to those skilled in the art. In an embodiment with a gear transmission, the gear transmission 112 may have a second idle gear drive system 111 that is mounted with an idler shaft 113 parallel to shaft 102. In this embodiment, idler gear 111 interacts with teeth located on the rotor 104. In an alternative embodiment, idler gear 111 interacts with teeth located on the cradle 110. The coupling transmission 112 may rotate the rotor 104 at a rate that is a predetermined ratio from the speed of rotation of the cradle 110. This ratio may be set based on the intended use of the line dispensing device 100.

The rotor 104, magnets 108, cradle 110, and coupling transmission 112 interact to form an eddy-current braking mechanism. The eddy-current braking mechanism does not utilize a clutch. Further, the eddy-current braking mechanism as described herein may be configured such that the speed of extension of the line 114 is constant over a range of applied torques (the "operating range"), the applied torque being the force applied to the rotor 104 or cradle 110 causing it to rotate. In one embodiment, the eddy-current braking mechanism is utilized in an auto-belay line dispensing device. In this embodiment, the torque operating range covers the torque of objects attached to the line 114 weighing from about 20 to about 330 pounds (about 10 to 150 kilograms).

Figure 18:
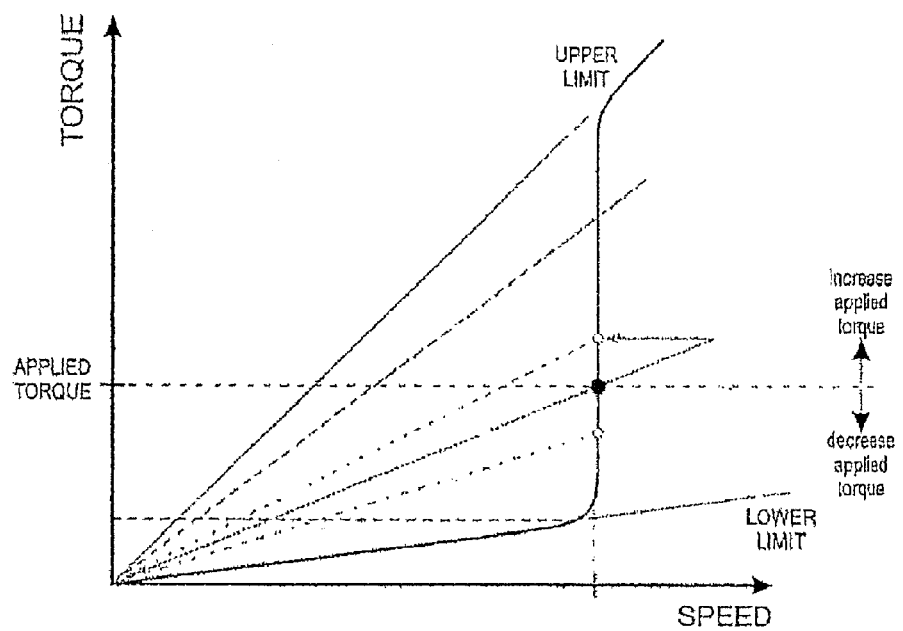
FIG. 18 illustrates and embodiment of a plot of Torque vs. Speed of the rotor used with the braking mechanism of FIGS. 16a-16c.
Figure 19:
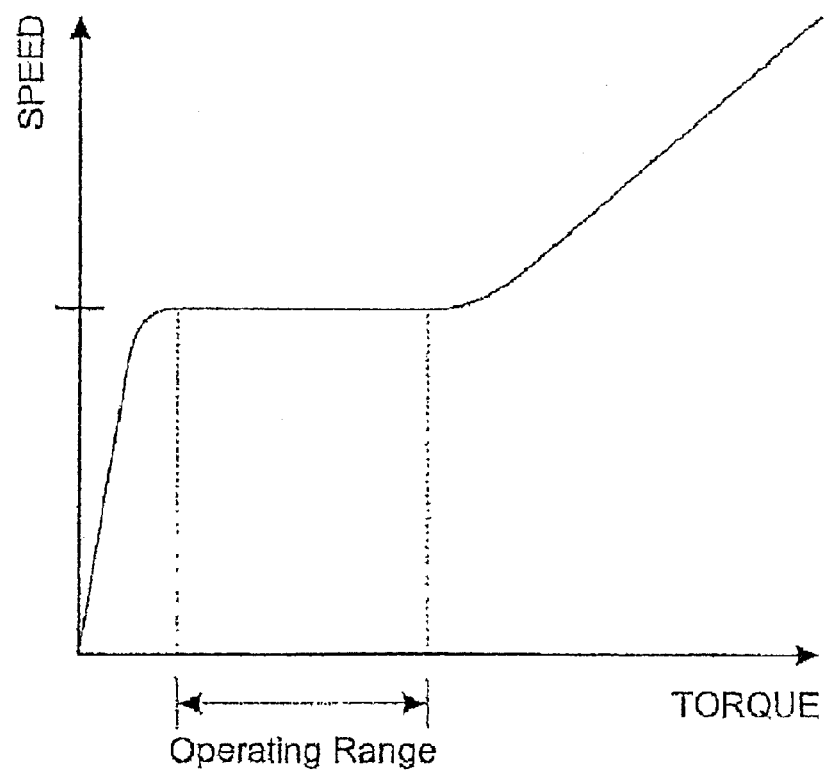
FIG. 19 illustrates and embodiment of a plot of Speed vs. Torque of the rotor used with the braking mechanism of FIGS. 16a-16c.

This constant speed of rotation, as illustrated in FIGS. 18-19, may arise due to any increase in the applied torque (in the operating range) being balanced by an equal and opposite increase in the braking torque arising from the induced eddy current as the conductor (i.e. the pivotable members 106 or cradle 110 depending upon the configuration) intersects more of the magnet field.

Thus, when the rotor initially begins to rotate, the speed of rotation of the eddy-current braking mechanism increases substantially linearly with the applied torque as illustrated in FIGS. 18-19. This situation continues until the electrical conductor, which is coupled to the rotor to rotate with it, enters the applied magnetic field of the magnet. Movement of the conductor through the magnetic field induces eddy currents in the conductor which oppose the motion through the magnetic field, thus providing a braking force on the motion of the conductor. The magnitude of the braking force depends on a number of factors, including the degree to which the conductor intersects the magnetic field and the strength of the field.

Figure 16A:
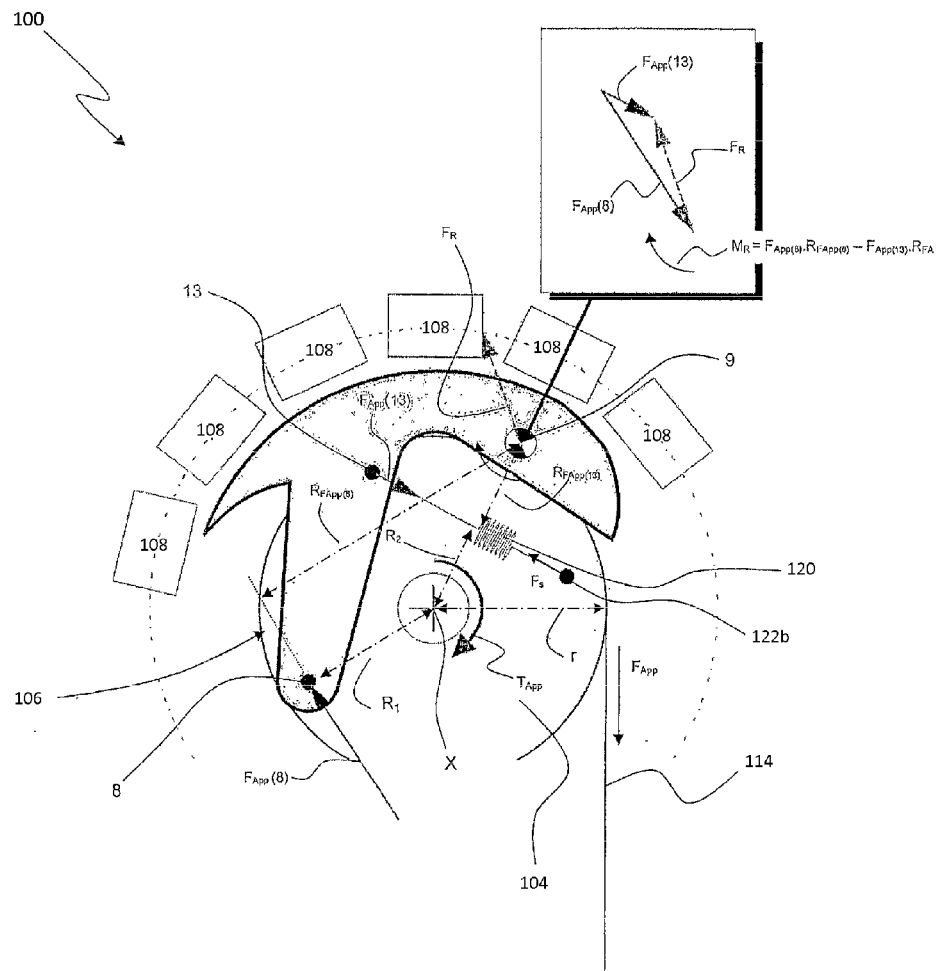
FIG. 16a illustrates and embodiment of a partial schematic plan diagram of an eddy current braking mechanism, the rotor moving in response to an initial braking torque and a force diagram of the eddy-current braking mechanism.
Figure 16B:
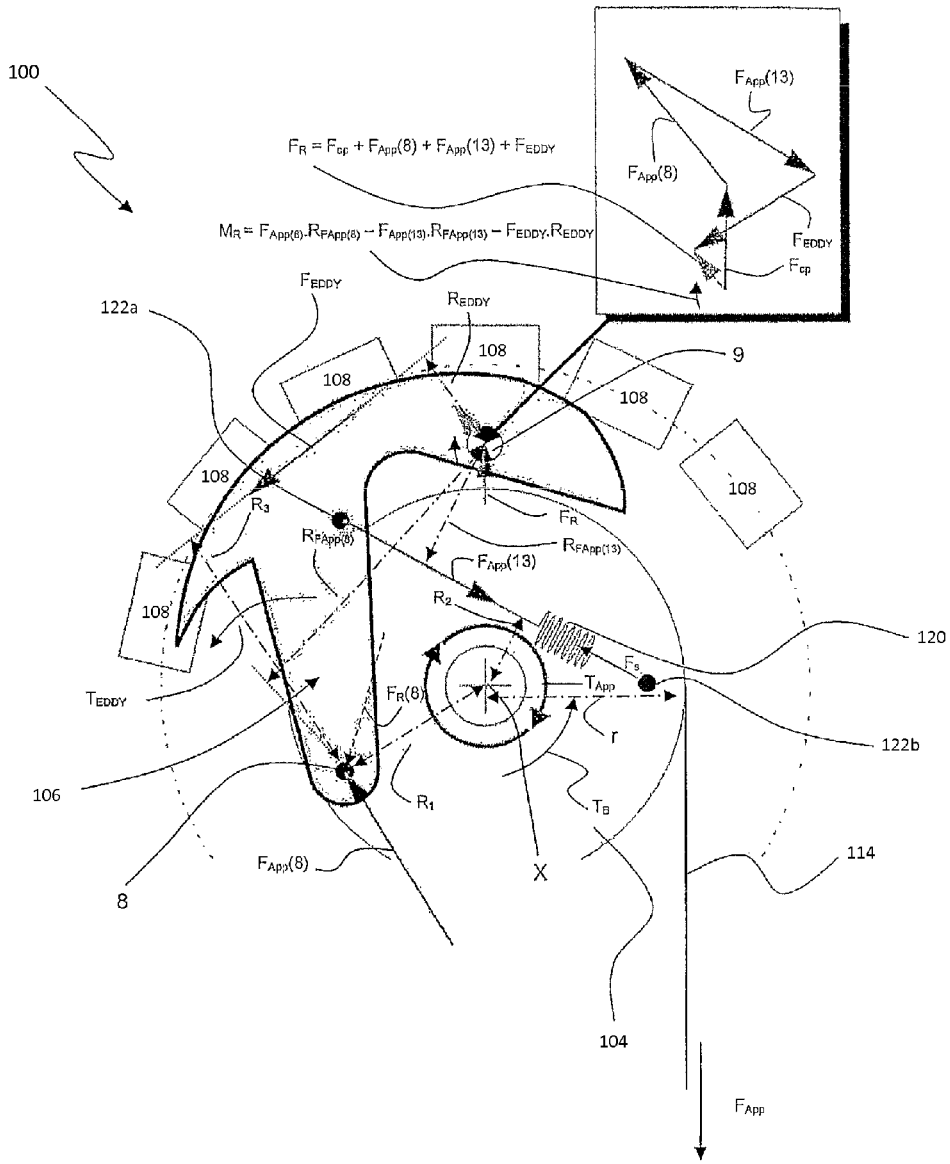
FIG. 16b illustrates and embodiment of a partial schematic plan diagram of the eddy current braking mechanism of FIG. 16a with the rotor rotating under an intermediate braking torque and a force diagram of the eddy-current braking mechanism.
Figure 16C:
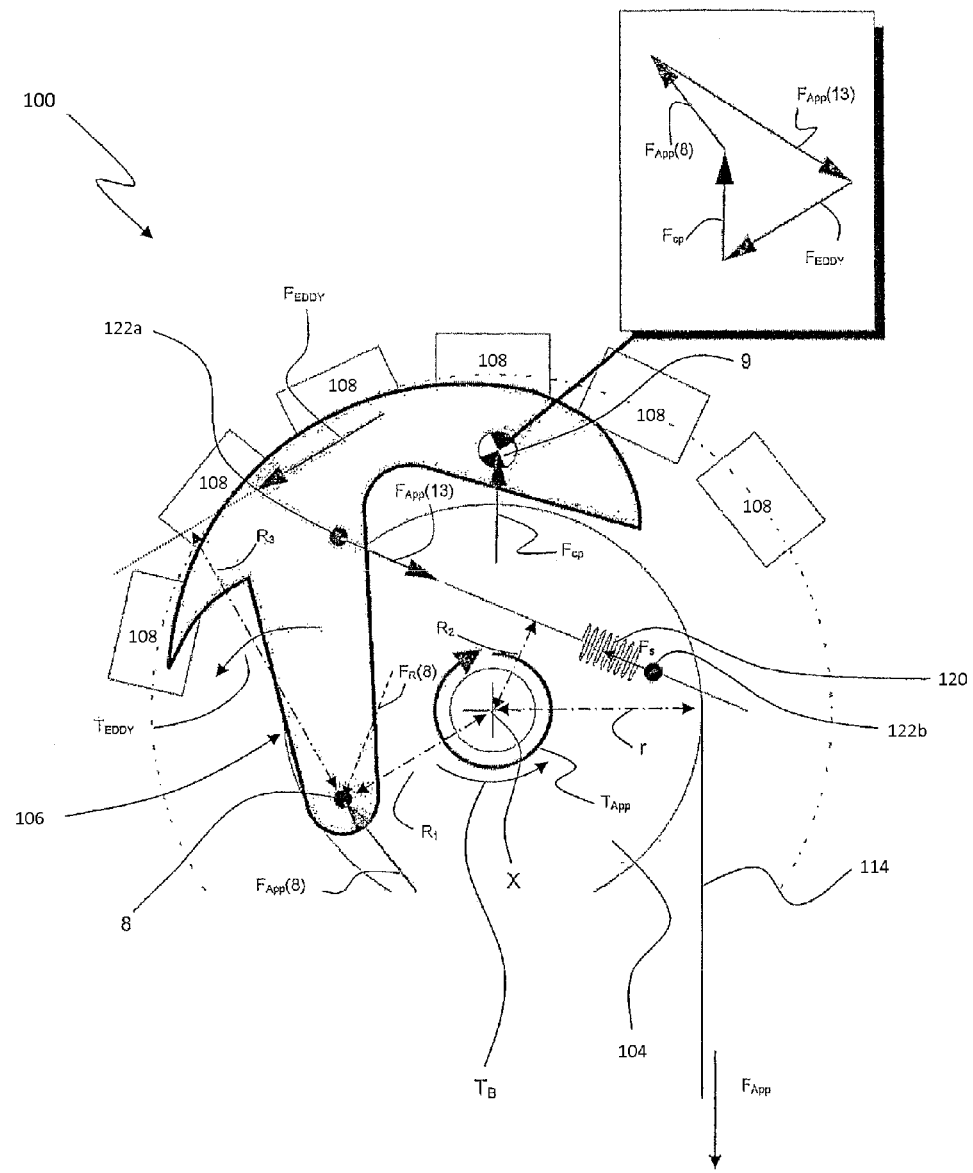
FIG. 16c illustrates and embodiment of a schematic plan diagram of the eddy current braking mechanism of FIGS. 16a and 16b with the rotor rotating under a maximum braking torque and a force diagram of the eddy-current braking mechanism.
Figure 17:
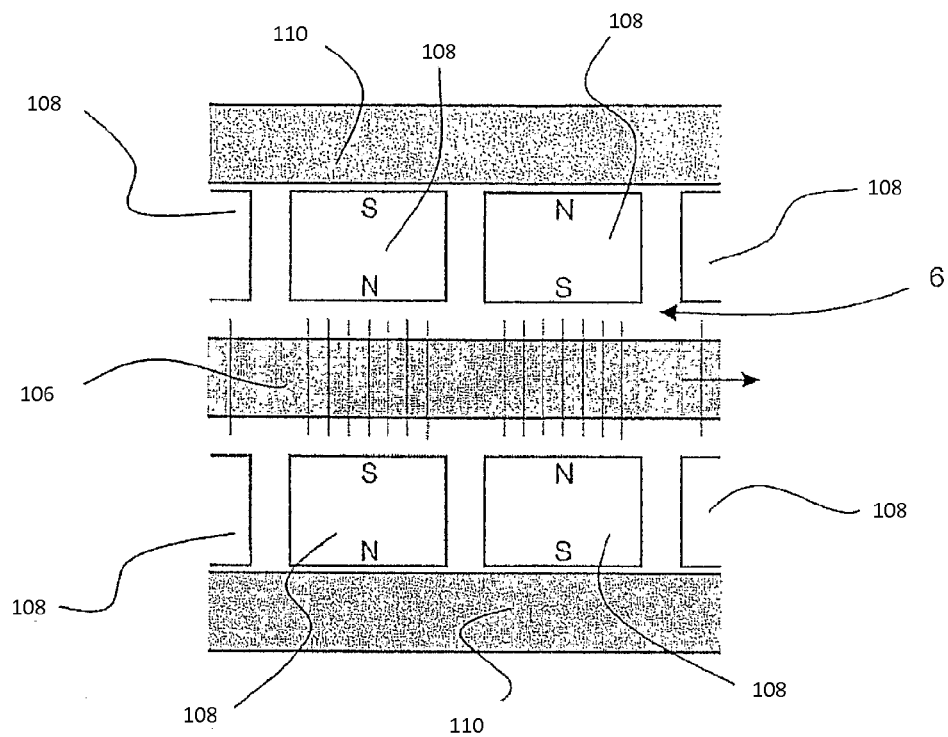
FIG. 17 illustrates and embodiment of a schematic side elevation of part of the eddy current braking mechanism of FIGS. 16a-16c.

As shown in the progression from FIG. 16a to FIG. 16c, upon a tangential force $F_{App}$ being applied to the rotor 104 (e.g. from a climber descending), the rotor 104 will rotate and the arms 106 will pivot about pivot points 8. As the applied force $F_{App}$ accelerates the rotor 104, the arms 106 will move into, and intersect the applied magnetic field 6. Any movement of the arms 106 through the applied magnetic field 6 (e.g. when rotating) induces eddy-currents in the arms 106 which in turn generate reactive magnetic fields opposing the applied magnetic field 6. FIG. 17 shows the magnets 108 positioned either side of the plane of rotation of the arms 106.

It will be appreciated that the force diagrams of FIGS. 16a-16c do not show an accurate detailed analysis of the many and varied dynamic forces acting on the arm 160 and thus the forces shown are simplistic and indicative only. The force diagrams 16a-16c, are provided to show a simplified example of the primary forces acting on the arm. Each diagram 16a-16c includes a box with the main forces added to show the approximate net force at the center of mass 9. It should be appreciated that these forces are indicative only and the force lines may not be of accurate length or direction.

FIG. 5a shows a force diagram of the eddy-current braking mechanism 1 in an initial 'start-up' stage where there is only a tangentially applied force $F_{App}$ and the spring 120 is not extended. As this force $F_{App}$ is applied tangentially to the rotor, a torque $T_A$ applied to the rotor and it will accelerate from rest. Components ($F_{App}$ (8) and $F_{App}$ (13)) of this force $F_{App}$ are respectively applied to the arm 106 via the pivot point 8 and spring connection 122a (also labeled as 13).

FIG. 16b shows the applied force $F_{App}$ accelerating the rotor 104 and attached arm 106. The arm 106 is pivoted at a greater angular displacement than that shown in FIG. 16a and now intersects the magnetic field 6. The rotor 104 and arm 106 have gained angular velocity about the rotor axis X and the arm 106 is accelerated towards the rotor axis X under centripetal acceleration. The mass centroid 9 applies a centrifugal force $F_{cp}$ to the arm 106.

In addition to the rotary forces, the eddy-current braking force $F_{EDDY}$ is also applied as the arm 160 is moving through the magnetic field.

The resultant force $F_R$ of the forces $F_{App}$ (K), $F_{App}$(13), $F_{cp}$, and $F_{EDDY}$ act on the mass centroid 8 to accelerate the arm 106 further outward from the rotor axis X.

The resulting anticlockwise rotation of the arm 3 about the pivot 8 increases the distance between connections 112a and connection 122b thereby extending the spring 120. The extension of the spring 120 increases the spring bias $F_s$ and correspondingly increases $F_{App}$(13) applied to connection 122a.

The rotor 104 will continue to accelerate and the arm 106 will continue to pivot anticlockwise until the force $F_{App}$(13) applied by the spring 120 on the arm 106 is sufficiently large to balance the forces acting on the arm such that $F_{11}$ and $M_{11}$ reduce to zero. At this point, the braking torque $T_\beta$ applied to the rotor through the transfer of $F_{mDY}$ via pivot 8 and connection 122b equals the applied torque $T_{App}$, the angular acceleration is thus equal to zero and the rotor 104 will rotate at a constant speed. A steady-state equilibrium position is then reached as shown in FIG. 16c.

In an eddy-current braking mechanism, as described herein, the strength of the magnetic field, configuration of the conductor, and the biasing device 120, may all be chosen such that an increase in torque applied to the rotor 104 is balanced by an equal and opposite increase in braking torque throughout the required operating range of torque, for a constant speed of rotation of the rotor 104 throughout the operating range. Accordingly, if the line dispensing device 100 is utilized to lower an object weighing 25 pounds and an object weighing 305 pounds, the objects will be lowered at substantially the same speed and/or rate by the line dispensing device 100.

At some applied torque the conductor may intersect the maximum area of magnetic field available under the particular embodiment of the braking mechanism. At this torque the braking force is also at a maximum. Therefore, as the applied torque is increased further, the speed of rotation will again become substantially linear with respect to the increase in applied torque.

For example, speed profiles of the eddy current braking system showing the operating range are shown in FIGS. 18 and 19. As can be seen from FIGS. 17 and 18, the speed initially increases with applied torque $T_A$ until the resultant force $F_{11}$ acting on the mass centroid accelerates the arms 106 outward into the magnetic field 6 and the reactive braking force $F_{EDDY}$ is applied. The resultant braking torque $T_B$ will increase and then equal the applied torque $T_{App}$. The speed of rotation is thereby limited to a constant value as no acceleration can occur due to the applied torque $T_{App}$ being continually matched by the braking torque $T_B$. Increases in applied torque $T_A$ are matched by increases in braking torque $T_B$ until an upper limit is reached where the maximum area of magnetic field 6 is intersected and thus the magnetic field reactive force $F_\beta$ generated is proportional to speed only. After the upper limit, the speed profile is similar to prior art devices which vary the braking torque $T_s$ with speed only.

As discussed above, the pivotable members 106 are pivotally mounted to the rotor 104. Further, the pivotable members 106 may include a biasing device 120. Even though one or both of the pivoting attachment of the pivotable members 106 or the biasing device 120 could mechanically fail, the eddy-current braking system will continue to function. The eddy-current braking mechanism inherently provides a safety stop in the event of a failure. For instance, if the biasing device 120 fails, the pivotable members 106 will simply expand with less rotational force causing the conductor to enter the magnetic field sooner, which merely causes the eddy-current mechanism to brake faster and/or sooner. Accordingly, the eddy-current braking mechanism does not contain a clutch and provides inherent safety mechanisms for these potential mechanical failures within the eddy-current braking.

Figure 13:
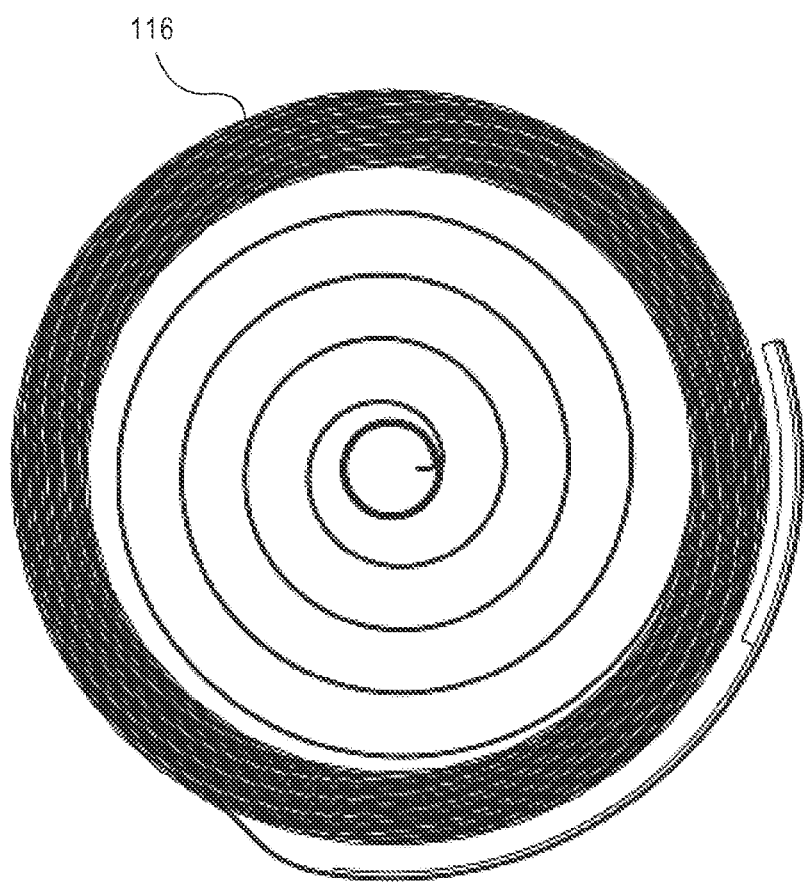
FIG. 13 illustrates an embodiment of a side view of the retraction mechanism for a line dispensing device.

The retraction mechanism 116 is either always biasing line 114 to retract or is at rest when the line 114 is fully retracted or retracted to an intended stopping or resting position. The force applied by the retraction mechanism 116 must be overcome to extend line 114. In one embodiment, the retraction mechanism 116 is a spring as illustrated in FIG. 13. The retraction mechanism 116 is attached to the shaft 102 at one end. The retraction mechanism 116 is operatively coupled to the line 114. As used herein the term "operatively coupled" to line 114 should be understood to mean any direct or indirect connection such that the retraction mechanism 116 moves with the extension or retraction of line 114. It should also be appreciated that connection need not be mechanical. As the line 114 extends, the retraction mechanism 116 is contracted increasing the biasing force applied to the line 114 by the retraction mechanism 116.

In one embodiment, the retraction mechanism 116 is housed in a retracting mechanism drum 140. The drum 140 may include a drum plate 141, a base plate 142, and an inner drum plate 144. The drum 140 fully encloses the retraction mechanism 116. The inner drum plate 144 may be located adjacent to retraction mechanism 116 within the drum plate 141. The base plate 142 may be located adjacent to the retraction mechanism 116 opposite the inner drum plate 144 and outside of the drum plate 141. In one embodiment, the inner drum plate 144 and base plate 142 prevent the retraction mechanism 116 from moving axially along the shaft 102. In the embodiment shown, the inner drum plate 144 and base plate 142 may be mounted to the drum plate 141 by any suitable connection mechanism for use in a line dispensing device 100. In one embodiment, clips are utilized to further stabilize and decrease the noise between the drum plate 141, the inner drum plate 144, and the base plate 142.

In one embodiment, one side of the drum plate 141 is attached to a portion of the cradle 110 via a connecting mechanism 148. As discussed above, the drum plate 141 may be attached to a portion that extends from the cradle drum 136 as illustrated in FIG. 8. In this embodiment, the retraction mechanism 116 is attached to the drum plate 141. Accordingly, the drum 140 rotates and causes the retraction mechanism 116 to contract as the cradle 110 rotates when the line 114 is extended. Further, in this embodiment, the drum 140 rotates in the opposite direction when the torque on the line 114 is less than the biasing force applied by the retraction mechanism 116. Accordingly, the rotation of the drum 140 in this direction causes the line 114 to retract.

While the rotation of the cradle 110 in the opposite direction does not allow the pivotable member 106 of the rotor 104 to expand or pivot, the rotation of the rotor 104 still intensifies the interaction of the conductive member with the magnetic field of the magnets 108 and increases the braking force applied to the line 114 during retraction. This interaction allows an empty, fully extended line 114 to be released for retraction without the risk of causing any damage to the body of the line dispensing device 100. The braking mechanism causes the line 114 to retract at a slower speed preventing the line 114 from whipping up and potentially damaging the line dispensing device 100, surrounding objects and/or people during the retraction of the line 114.

Figure 7:
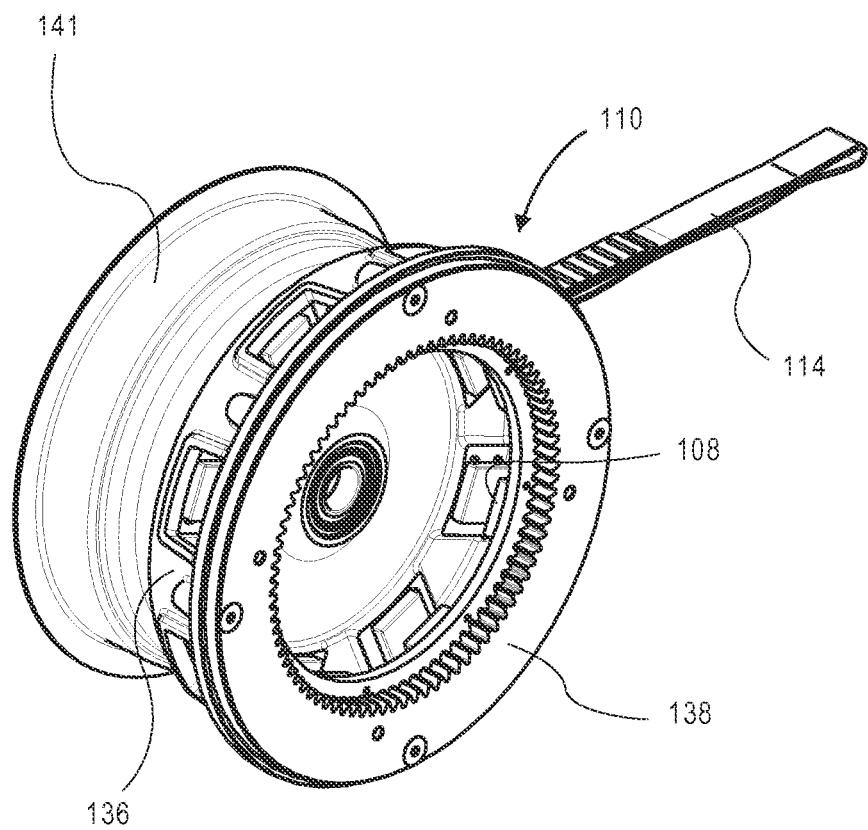
FIG. 7 illustrates an embodiment of an isometric view of a configuration of a cradle, magnet arrangement, a retraction mechanism drum, and a line of a line dispensing device.

As discussed above, the line 114 is attached to the cradle 110 via a line attachment site 152. In one embodiment, the line 114 is a type of webbing. The line 114 may be one continuous piece or may be divided into a plurality of pieces. In one embodiment, the line 114 includes a starter portion that anchors the remaining line or primary portion to the cradle 110. The starter portion contains a means for connecting the line 114 to the cradle 110. In one embodiment, the line 114 is attached to the cradle 110 via a pin and loop mechanism. The starter portion is connected to the primary portion with a mechanical connection 154. In another embodiment, the mechanical connection 154 is a shackle. The starter portion of the line 114 allows the primary portion of the line 114 to be replaced at the mechanical connection 154 without having to disassemble the line dispensing device 100. In one embodiment, the line 114 winds around the cradle 110 as shown in FIGS. 6 and 7.

As shown in FIGS. 1 and 6, the line 114 utilizes a guide roller 150 before exiting the device 100. The guide roller 150 is attached to the housing panels 118. The guide roller 150 positions the line 114 to exit the housing panels 118. Further, the guide roller 150 provides for smoother extension and retraction of line 114.

In an embodiment, the line 114 moves through a nozzle 146 attached to the housing panels 118. In an embodiment, the nozzle 146 is removable from the housing panels 118 and provides an opening in the device 100 for the line 114 to extend and retract through. In one embodiment, the nozzle 146 is made of a plurality of parts. In another embodiment, the nozzle 146 includes two identical pieces that can be combined with a u-shaped pin, as illustrated in FIG. 1. In yet another embodiment, the nozzle 146 snap fits into the housing panels 118. In another embodiment, the nozzle 146 is slid into the housing panels 118 and locked in place with a u-shaped pin as illustrated in FIGS. 4 and 5. The nozzle 146 may be attached to the housing panels 118 in any suitable manner for allowing the nozzle 146 to be removed and reinstalled into the housing panels 118. In a further embodiment, a majority of the nozzle 146 is located exterior to the housing panels 118.

As a safety feature, in one embodiment, the nozzle 146 is designed to bear a load beyond the capacity of the line dispensing device 100. Accordingly, the nozzle 146 is suitable for holding the line 114 and the weight of anything attached to the line 114 in the event the starter portion of line 114 detaches from the cradle 110 and is held up solely by the nozzle 146. In the embodiment shown, the line 114 has a mechanical connection 154 between the starter portion of line 114 and the primary portion of line 114 that is too large to exit through the nozzle 146 and is retained by nozzle 146 in the event of a line 114 failure. However, if the nozzle 146 is removed from the housing panels 118, the mechanical connection 154 is small enough to exit the housing panels 118 to allow access to the mechanical connection 154 for replacement of the main portion of the line 114. In an alternative embodiment, a stop portion (not shown) that is not the mechanical connection 154 may be provided at any location in the line 114 specifically to prevent further extension of the line 114.

During use, the line 114 of the line dispensing device 100 often rubs against the nozzle 146. In certain circumstances, this contact weakens the line 114 or even causes the line 114 to fail. Accordingly, in one embodiment, the nozzle 146 is made of a polymer specifically selected for its wear properties vis-à-vis the line material. In an embodiment, the polymer is a polyethylene-based polymer. In another embodiment, the polymer is polyoxymethylene. The polyethylene-based polymer or polyoxymethylene nozzle becomes worn from contact between the nozzle 146 and the line 114; however, it has been determined through testing that these polymers cause very little, if any, wear to the line 114. Thus, in an embodiment, it is preferable that at least the surface of the nozzle 146 that contacts the line 114, if not all of the nozzle 146, be made of a polyethylene-based polymer or polyoxymethylene. Other polymer species or materials that reduce wear on the line 114 used may be substituted. If the nozzle 146 becomes damaged, the nozzle 146 can be easily removed and replaced.

Figure 2:
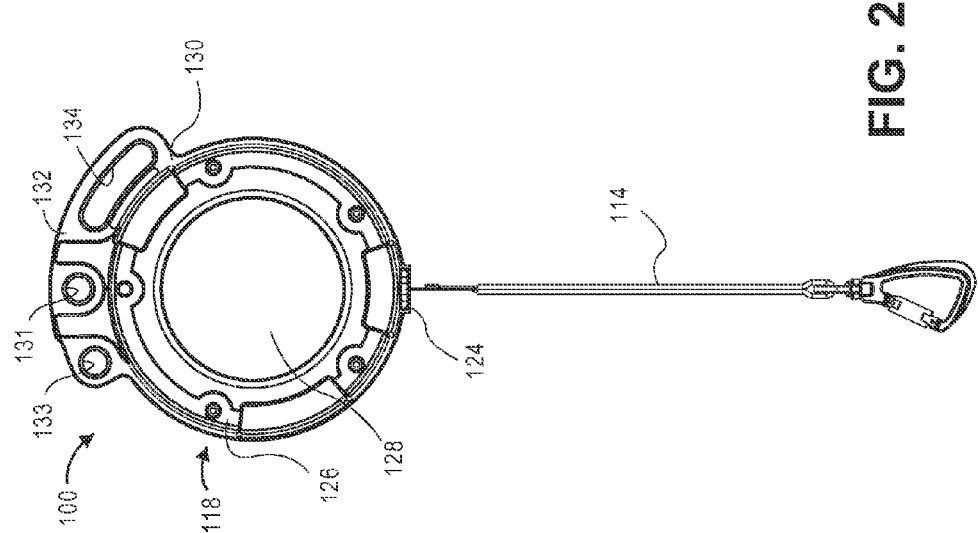
FIG. 2 illustrates an embodiment of a side view of a line dispensing device.

FIG. 14 illustrates an embodiment of a method for dispensing and retracting a line of a line dispensing device 1400. As illustrated in FIG. 2, method 1400 provides a line for extension and retraction 1402. In one embodiment, the line is webbing. The line may be one continuous piece or may be divided into a plurality of pieces. In one embodiment, the line includes a starter portion that anchors the remaining line or primary portion to the line dispensing device. The starter portion is connected to the primary portion of line with a mechanical connection. In another embodiment, the mechanical connection is a shackle. The starter portion of the line allows the primary portion of the line to be replaced at the mechanical connection without having to disassemble the line dispensing device.

Further, method 1400 applies a retraction force to the line with a retracting mechanism 1404. In one embodiment, the retracting mechanism is a spring. The retracting mechanism may be any suitable device for retracting a line in a line dispensing device. In one embodiment, the retracting mechanism is always active or is always applying a retraction force to the line. Accordingly, for the line to extend, the line must overcome this retraction force. The retraction mechanism is anchored to the line dispensing device and operatively coupled to the line.

Method 1400 applies a braking force to the line providing a substantially constant speed for extension over a range of applied torques 1406, as illustrated in FIGS. 18-19. The braking force is provided by balancing an increase in an applied torque with an equal and opposite increase in a braking torque arising from an induced eddy-current from conductive members intersecting a larger portion of a magnetic field. In one embodiment, the range of applied torques covers objects attached to the line weighing from about 20 to 330 pounds.

In one embodiment, method 1400 further applies a braking force to the line for retraction with the intersection of the conductive members and the magnetic field from an induced eddy-current. The braking force reduces retraction speed of the line enough to allow a fully extended line with nothing attached to the line to "cleanly retract". As used herein, the phrase "cleanly retract" refers to retraction that is slow enough to allow a fully extended line with nothing attached to the line to fully retract without damaging the line dispensing device or excessive whipping, which could injure nearby objects or persons.

Embodiments of the line dispensing devices as described above are particularly adapted for certain uses in which safe and controlled extension and retraction of a line is necessary, such as for use in challenge courses, adventure courses, races, training and evacuation. Current auto-belay safety devices are not suitable for such uses because they are either designed for single use (e.g., to protect a single uncontrolled fall) or, if they are allowed to retract without a load (e.g., a user releases the line allowing the device to retract the line with no load), they do so in an uncontrolled and dangerous fashion at a very high speed often resulting in damage to the device or the line.

In embodiments of the devices described herein, the braking mechanism can be designed to apply a first amount of braking when under load so that loads are lowered at a first velocity and apply a second amount of braking when retracting an unloaded line with the retraction mechanism. This allows the line dispensing devices described herein to be used safely and repeatedly as a lowering device.

A challenge course is a term that refers to obstacle-type courses designed to challenge a person or team, and are sometimes referred to as a "ropes course". These are popular in the United States for team building events and they often include obstacles that involve one or more participants to perform actions some height above the ground. Currently, such courses use a human belayer to protect the participant at risk in case the participant falls from the obstacle. One use of the line dispensing device is to replace the human belayer with the line dispensing devices. Current auto-belay devices are unsuitable for this application because the cost of replacing or servicing the device after each fall would be cost prohibitive. Because the line dispensing devices described herein can retract safely at a controlled speed due the braking effect, the human belayer can be replaced with a line dispensing device.

An adventure course refers to courses provided for fun and thrill that often include things like crossing bridges, ziplines, rappelling or climbing done at a height above the ground. While participants are not intended to fall, because of the potential risk participants are often belayed by a human while at unsafe heights. Again, because of the ability of some embodiments of the line dispensing devices to retract safely and repeatedly when not loaded, these embodiments are suitable for replacing the human belayer.

Likewise, training activities that involve performing actions at heights are another example of an activities in which embodiments described herein may be used to replace human belayers. Such activities could include military, police, search and rescue and fire department training activities. These activities could include rappelling or jumping from fixed platforms (e.g., down the side of buildings) or from moving platforms (e.g., helicopters, gondolas, decks of ships). In such uses, the line dispensing device could be the means of lowering the participants (e.g., to protect jumpers) or be a back-up safety device (e.g., to protect a person on rappel).

Another activity for which the embodiments described herein are particularly suited are contests that include descending from a height. Because the line retraction speed is fixed and safe, the line dispensing device can be used to protect contestants in adventure races involving rappelling and jumping from heights, or any other activity at a height. As the retraction speed will be the same for all contestants, this variable is removed from the contest.

Yet another use for the line dispensing devices described herein is as an evacuation aid in situations where multiple people may have to be evacuated from a height (e.g., oil platform, scaffolding, window washing platform, etc.) but where it is not feasible to have an auto-belay for each person. For example, the upper platform around the crown block of an oil derrick could be provided with an embodiment of a line-dispensing device having enough fire-resistant line to reach the ground. This device could then be used as the escape mechanism instead of or in addition to the Geronimo line.

The induced eddy-current braking may be performed by the eddy-current braking mechanism as described herein and/or in PCT Application No. PCT/NZ2010/000011, filed Jan. 29, 2010, and entitled, "Improvements in and relating to braking mechanisms", which is hereby incorporated in its entirety herein, by reference.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the disclosure. For example, the materials utilized may be modified and the housing may be made in any suitable shape based on the desired end use of the line dispensing device. Numerous other changes may be made which will readily suggest themselves to those skilled in the art and which are encompassed in the spirit of the disclosure.

What is claimed is:

1. A method for dispensing and retracting a line of a dispensing device, the method comprising:
    rotating a cradle around a shaft in a first direction in response to a retraction force applied via a retracting mechanism that is attached to the cradle at a first end and attached to the shaft at a second end of the retracting mechanism;
    rotating at least one magnet attached to the cradle around the shaft in the first direction when the cradle rotates in the first direction;
    rotating the cradle around the shaft in a second direction in response to an extension force on the line sufficient to overcome the retraction force applied via the retracting mechanism;
    rotating the at least one magnet attached to the cradle around the shaft in the second direction when the cradle rotates in the second direction;
    rotating a rotor, located within the cradle and coupled to the cradle via a transmission system, around the shaft in response to the cradle rotating in the one of the first and second directions, wherein the rotor is configured to rotate in response to the cradle rotating in the first direction and the rotor is configured to rotate in response to the cradle rotating in the second direction, the rotor including a center component and at least one pivotable member movably attached to the center component;
    pivoting the at least one pivotable member away from the center component and into a portion of a magnetic field of the at least one magnet, the portion of the magnetic field extending at least partially orthogonal to a plane of rotation of the at least one pivotable member, the at least one pivotable member extending into a larger amount of the portion of the magnetic field as a direct result of increasing centrifugal force caused by the rotating of the rotor around the shaft;
    generating a frictionless braking force from an induced eddy-current created by the at least one pivotable member intersecting the portion of the magnetic field to control a rotation speed of the cradle;
    retracting the line attached to the cradle when the cradle rotates in the first direction at a substantially constant rate over a range of varying applied retracting forces based on the control of the rotation speed of the cradle; and
    extending the line attached to the cradle when the cradle rotates in the second direction at a substantially constant rate over a range of varying applied extending forces based on the control of the rotation speed of the cradle.

2. The method of claim 1, wherein the frictionless braking force reduces refraction speed of the line enough to allow a fully extended line with nothing attached to the line to cleanly retract.

3. The method of claim 1, wherein the range of varying applied extending forces on the line covers objects attached to the line weighing from about 20 to about 330 pounds.

4. The method of claim 1, wherein the frictionless braking force is tuned by at least one of the following:
    varying a strength of the magnetic field;
    varying a configuration of the at least one pivotable member;
    controlling a rate at which the at least one pivotable member enters the magnetic field based on an integration of a biasing mechanism; and
    controlling an extent to which the at least one pivotable member enters the magnetic field.

5. The method of claim 1, wherein the retracting mechanism is a spring.

6. The method of claim 1, wherein the retracting mechanism always applies the retraction force to the line.

7. The method of claim 1, wherein the at least one pivotable member is operatively coupled to the line.

8. The method of claim 1, wherein the magnetic field is counter-rotating with respect to the at least one pivotable member.

* * * * *